US012645089B2

(12) United States Patent
Imamura et al.

(10) Patent No.: US 12,645,089 B2
(45) Date of Patent: Jun. 2, 2026

(54) OPTICAL DEVICE

(71) Applicant: Panasonic Intellectual Property Management Co., Ltd., Osaka (JP)

(72) Inventors: Norihiro Imamura, Osaka (JP); Kenji Nagatomi, Osaka (JP); Michihiro Yamagata, Osaka (JP); Keiichi Matsuzaki, Kyoto (JP); Hirofumi Hoshida, Osaka (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 319 days.

(21) Appl. No.: 18/391,202

(22) Filed: Dec. 20, 2023

(65) Prior Publication Data

US 2024/0126094 A1     Apr. 18, 2024

Related U.S. Application Data

(63) Continuation of application No. PCT/JP2022/000943, filed on Jan. 13, 2022.

(30) Foreign Application Priority Data

Jun. 30, 2021     (JP) ................................. 2021-109063
Dec. 2, 2021     (JP) ................................. 2021-196548

(51) Int. Cl.
G02B 27/14     (2006.01)
B60K 35/10     (2024.01)
B60K 35/22     (2024.01)
B60K 35/50     (2024.01)
(Continued)

(52) U.S. Cl.
CPC .............. *G02B 27/14* (2013.01); *B60K 35/10* (2024.01); *B60K 35/22* (2024.01); *B60K 35/50* (2024.01); *B60R 1/04* (2013.01); *B60R 2001/1253* (2013.01)

(58) Field of Classification Search
CPC ........ G02B 27/14; B60K 35/10; B60K 35/22; B60K 35/50; B60R 1/04; B60R 2001/1253
See application file for complete search history.

(56) References Cited

U.S. PATENT DOCUMENTS

2020/0377021 A1     12/2020   So et al.

FOREIGN PATENT DOCUMENTS

JP          08-179227          7/1996
JP          2013-148599        8/2013
JP          2014-107725        6/2014
(Continued)

OTHER PUBLICATIONS

WO-2017199640-A1, translation (Year: 2017).*
(Continued)

*Primary Examiner* — Wen Huang
(74) *Attorney, Agent, or Firm* — Greenblum & Bernstein, P.L.C.

(57) ABSTRACT
A display apparatus includes a housing and at least one mirror. The housing can be detachably mounted on a display and includes an entrance that allows light emitted from the display to enter the interior of the housing with the housing mounted on the display and an exit that allows the light having entered the interior of the housing through the entrance to exit to the exterior of the housing. The at least one mirror reflects the light having entered the interior of the housing through the entrance to the exit.

11 Claims, 20 Drawing Sheets

(51) Int. Cl.
    *B60R 1/04*         (2006.01)
    *B60R 1/12*         (2006.01)

(56)            References Cited

FOREIGN PATENT DOCUMENTS

| | | | | |
|---|---|---|---|---|
| JP | 2017-210229 | 11/2017 | | |
| JP | 2018-185514 | 11/2018 | | |
| JP | 2020-088405 | 6/2020 | | |
| JP | 2021-088329 | 6/2021 | | |
| WO | WO-2017199640 A1 * | 11/2017 | ............. | G02B 27/01 |

OTHER PUBLICATIONS

Official Communication issued in International Patent Application No. PCT/JP2022/000943, dated Apr. 5, 2022, along with an English translation thereof.

* cited by examiner

OPTICAL DEVICE

CROSS REFERENCE TO RELATED APPLICATIONS

This is a continuation application of PCT International Application No. PCT/JP2022/000943 filed on Jan. 13, 2022, designating the United States of America, which is based on and claims priority of Japanese Patent Application No. 2021-109063 filed on Jun. 30, 2021, and Japanese Patent Application No. 2021-196548 filed on Dec. 2, 2021.

FIELD

The present disclosure relates to an optical device.

BACKGROUND

Displays for displaying images are well known. For example, as an example of such displays, Patent Literature (PTL) 1 discloses image displaying means that displays an image created on the basis of an image behind an automobile captured by a camera.

CITATION LIST

Patent Literature

PTL 1: Japanese Unexamined Patent Application Publication No. 2020-88405

SUMMARY

However, the image displaying means according to PTL 1 can be improved upon.

In view of this, the present disclosure provides an optical device capable of improving upon the above related art.

An optical device according to an aspect of the present disclosure includes a housing detachably mountable on a display and including an entrance that allows light emitted from the display to enter an interior of the housing with the housing mounted on the display and an exit that allows the light having entered the interior of the housing through the entrance to exit to an exterior of the housing and at least one mirror that reflects the light having entered the interior of the housing through the entrance to the exit.

Moreover, an optical device according to an aspect of the present disclosure includes a housing detachably mountable on a display and including an entrance that allows light emitted from the display to enter an interior of the housing with the housing mounted on the display and an exit that allows the light having entered the interior of the housing through the entrance to exit to an exterior of the housing and a convex lens disposed on an optical path extending from the entrance to the exit. With the housing mounted on the display, a distance from the display to the convex lens is shorter than a focal length of the convex lens.

An optical device according to the present disclosure is capable of improving upon the above related art.

BRIEF DESCRIPTION OF DRAWINGS

These and other advantages and features of the present disclosure will become apparent from the following description thereof taken in conjunction with the accompanying drawings that illustrate a specific embodiment of the present disclosure.

FIG. 2 illustrates the display apparatus in FIG. 1.

FIG. 5 illustrates a display apparatus according to Embodiment 4.

FIG. 7 illustrates a display apparatus according to Embodiment 5.

FIG. 8 illustrates a display apparatus according to Embodiment 6.

FIG. 14 is a three-view drawing of a convex lens included in the display apparatus in FIG. 13.

DESCRIPTION OF EMBODIMENTS

Figure 1:
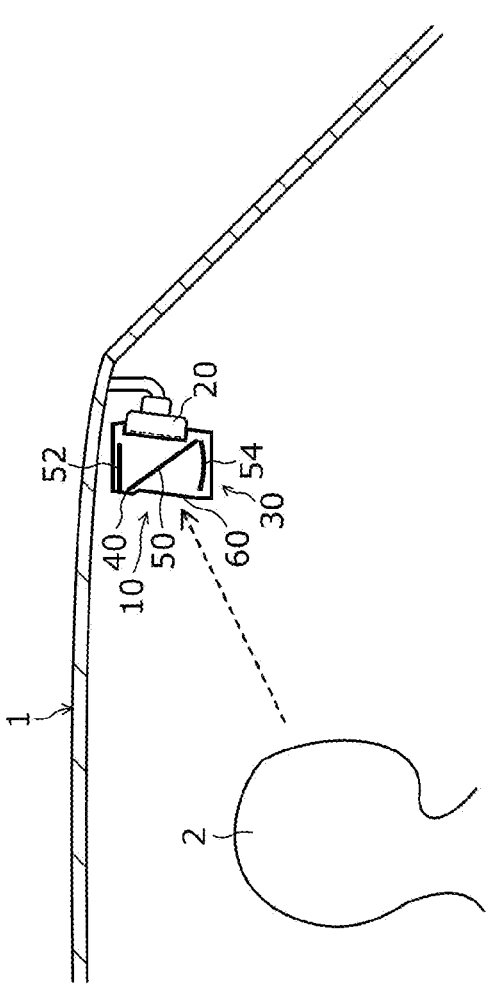
FIG. 1 illustrates a state in which a display apparatus according to Embodiment 1 is installed in a vehicle.

An optical device according to an aspect of the present disclosure includes a housing detachably mountable on a display and including an entrance that allows light emitted from the display to enter an interior of the housing with the housing mounted on the display and an exit that allows the light having entered the interior of the housing through the entrance to exit to an exterior of the housing and at least one mirror that reflects the light having entered the interior of the housing through the entrance to the exit.

According to this, when bringing an image displayed by the display into focus becomes difficult, mounting the housing on the display can increase the length of the optical path of the light emitted from the display compared to before the housing is mounted on the display. This allows the image displayed by the display to be displayed farther compared to before the housing is mounted on the display, and thereby the image displayed by the display can be brought into focus easily. That is, while bringing the image displayed by the image displaying means in PTL 1 into focus often becomes difficult, the image displayed by the display can be brought into focus easily with the optical device according to the above-described aspect. Thus, the optical device is capable of improving upon the above related art.

Moreover, the at least one mirror may include a half mirror and a concave mirror, and the light having entered the interior of the housing through the entrance may be reflected by the half mirror, reflected by the concave mirror after being reflected by the half mirror, and transmitted through the half mirror after being reflected by the concave mirror to exit to the exterior of the housing through the exit.

According to this, the length of the optical path of the light emitted from the display can be easily increased by reflecting the light having entered the interior of the housing through the entrance using the half mirror and the concave mirror. This allows the image displayed by the display to be displayed farther easily compared to before the housing is mounted on the display, and thereby the image displayed by the display can be brought into focus more easily.

Moreover, the at least one mirror may include a half mirror, a first mirror, and a second mirror, and the light having entered the interior of the housing through the entrance may be reflected by the first mirror, reflected by the half mirror after being reflected by the first mirror, reflected by the second mirror after being reflected by the half mirror, and transmitted through the half mirror after being reflected by the second mirror to exit to the exterior of the housing through the exit.

According to this, the length of the optical path of the light emitted from the display can be easily increased by reflecting the light having entered the interior of the housing through the entrance using the half mirror, the first mirror, and the second mirror. This allows the image displayed by the display to be displayed farther easily compared to before the housing is mounted on the display, and thereby the image displayed by the display can be brought into focus more easily.

Moreover, the at least one mirror may include a half mirror, a first mirror, and a second mirror, and the light having entered the interior of the housing through the entrance may be reflected by the half mirror, reflected by the first mirror after being reflected by the half mirror, reflected by the second mirror after being reflected by the first mirror and transmitted through the half mirror, and reflected by the half mirror after being reflected by the second mirror to exit to the exterior of the housing through the exit.

According to this, the length of the optical path of the light emitted from the display can be easily increased by reflecting the light having entered the interior of the housing through the entrance using the half mirror, the first mirror, and the second mirror. This allows the image displayed by the display to be displayed farther easily compared to before the housing is mounted on the display, and thereby the image displayed by the display can be brought into focus more easily.

Moreover, the optical device may further include a convex lens disposed on an optical path extending from the entrance to the exit.

This allows the image displayed by the display to be displayed farther easily compared to before the housing is mounted on the display, and thereby the image displayed by the display can be brought into focus more easily.

Moreover, the optical device may further include a convex lens disposed on an optical path extending from the entrance to the at least one mirror, the convex lens may shrink the light having entered the interior of the housing through the entrance, and the at least one mirror may enlarge the light shrunk by the convex lens.

According to this, the shrunk light (intermediate image) is formed and is then enlarged, increasing the resolution of the virtual image.

Moreover, an optical device according to an aspect of the present disclosure includes a housing detachably mountable on a display and including an entrance that allows light emitted from the display to enter an interior of the housing with the housing mounted on the display and an exit that allows the light having entered the interior of the housing through the entrance to exit to an exterior of the housing and a convex lens disposed on an optical path extending from the entrance to the exit. With the housing mounted on the display, a distance from the display to the convex lens is shorter than a focal length of the convex lens.

According to this, when bringing the image displayed by the display into focus becomes difficult, mounting the housing on the display can cause the image displayed by the display to be displayed farther compared to before the housing is mounted on the display, and thereby the image displayed by the display can be brought into focus easily.

Moreover, the convex lens may be a Fresnel lens.

This brings the image displayed by the display into focus easily while preventing the optical device from increasing in size.

Moreover, each of one main surface and an other main surface of the convex lens may be a cylindrical surface.

This brings the image displayed by the display into focus easily while preventing the light transmitted through the convex lens from converging to one point.

Moreover, a curvature of the one main surface and a curvature of the other main surface may differ from each other.

This prevents astigmatism from occurring.

Moreover, the optical device may further include a rearview mirror removably attached to the exit or a liquid crystal mirror attached to the exit.

According to this, even when the display installed in a vehicle breaks down, the rearview mirror or the liquid crystal mirror enables the state behind the vehicle to be visible.

Moreover, the optical device may further include a light-transmitting cover disposed at the entrance to face the display with the housing mounted on the display.

This prevents dust and the like from entering the interior of the housing through the entrance.

Moreover, the optical device may include an optical film affixed to the light-transmitting cover.

According to this, the vibration direction and the like of the light emitted from the display can be easily changed. Thus, the light can be easily reflected, and the image displayed by the display can be brought into focus more easily.

Moreover, the optical device may further include a position adjuster for adjusting a position of the housing relative to the display with the housing mounted on the display.

According to this, the length of the optical path of the light emitted from the display can be easily adjusted. Thus, the image displayed by the display can be brought into focus more easily.

Moreover, the display may include a switch for operating the display, and the optical device may further include an operation portion for operating the switch with the housing mounted on the display.

According to this, even with the housing mounted on the display, the switch provided for the display can be operated.

Moreover, the operation portion may include a first member that can be pushed in a depth direction of the housing and a second member that moves in an intersecting direction intersecting the depth direction to push the switch when the first member is pushed in the depth direction with the housing mounted on the display, and the second member may be movable in the intersecting direction with the housing dismounted from the display.

According to this, when the housing is to be mounted on the display upside down, for example, the second member protrudes downward by gravity. Accordingly, the second member comes into contact with the display to prevent the housing from being mounted on the display. This reduces the possibility that the housing is mounted upside down.

Moreover, the display may include an optical sensor that detects light outside the display, and the optical device may further include a light guide that guides light to the optical sensor with the housing mounted on the display.

According to this, even with the housing mounted on the display, light can be guided to the optical sensor provided for the display.

Moreover, the optical device may further include a rubber component having a ring shape and disposed around a perimeter of the entrance to abut on the display with the housing mounted on the display.

This prevents dust and the like from entering the interior of the housing through the entrance with the housing mounted on the display.

Moreover, the optical device may further include, in a periphery of the entrance, (i) an upper guide disposed at a position corresponding to an upper part of the display when the display is viewed from a front, (ii) a lower guide disposed at a position corresponding to a lower part of the display when the display is viewed from the front, (iii) a left guide disposed at a position corresponding to a left part of the display when the display is viewed from the front, and (iv) a right guide disposed at a position corresponding to a right part of the display when the display is viewed from the front. At least one of the upper guide or the lower guide may be movable in a direction in which the upper guide and the lower guide are aligned, and at least one of the left guide or the right guide may be movable in a direction in which the left guide and the right guide are aligned.

According to this, the movable guides enable the housing to be mounted on the display such that the entrance and the screen of the display that varies in size are in alignment. This prevents misalignment or rotational shift of the image caused when, for example, the screen of the display is out of alignment with the entrance and shifted vertically, laterally, or diagonally with respect to the entrance during securing.

Moreover, the housing may further include a placement portion in which the display is removably placed such that the display faces the entrance and that the display is located at a predetermined distance from the entrance.

This allows the image displayed by, for example, the mobile display placed in the placement portion to be displayed farther as a virtual image, and thereby the image displayed by the display can be brought into focus easily.

Moreover, the at least one mirror may include a concave mirror, and the display may be removably placed in the placement portion such that an emission angle of the light emitted from the display is equal to a reflection angle of the light from the concave mirror.

This prevents the image formed by the light emitted from the display from being distorted.

Moreover, the placement portion may include a first movable stopper that abuts on either an upper side or a lower side of the display when the display is viewed from a front and a second movable stopper that abuts on either a left side or a right side of the display when the display is viewed from the front.

This allows the display to be easily secured in the placement portion.

Moreover, the housing may further include a transmissive polarizer disposed at the exit.

This reduces reflection of external light in the exit.

Note that each of the embodiments described below illustrates a specific example of the present disclosure. The numerical values, shapes, materials, elements, positions and connections of the elements, steps, order of steps, and the like shown in the following embodiments are mere examples and are not intended to limit any aspect of the present disclosure. Moreover, among the elements in the following embodiments, those that are not recited in any of the independent claims are described as optional elements.

Moreover, in the following embodiments, terms such as "parallel" and "orthogonal" may be used to indicate relative orientations of two directions. These terms, however, may be different from the orientations in the strict sense. For example, unless otherwise noted, an expression "two directions are parallel" indicates not only that the two directions are exactly parallel but that the two directions are substantially parallel; that is, for example, there may be a difference of a few percent between the two directions.

Moreover, optical paths illustrated in the drawings in the following embodiments are given to illustrate the principle concepts and do not necessarily reflect actual optical paths.

Embodiment 1

FIG. 1 illustrates a state in which display apparatus 10 according to Embodiment 1 is installed in vehicle 1. In FIG. 1, vehicle 1 and housing 40 are illustrated in cross section.

As illustrated in FIG. 1, display apparatus 10 is used for displaying an image. In this embodiment, display apparatus 10 is installed in the cabin of vehicle 1. For example, display apparatus displays an image captured by a camera that captures the image behind vehicle 1. Thus, driver 2 of vehicle 1 can view the state behind vehicle 1 by looking at display apparatus 10 (see broken line arrow in FIG. 1).

Note that, for example, display apparatus 10 may display an image indicating the speed of vehicle 1, results of detection of objects approaching vehicle 1, information about navigation from the current location of vehicle 1 to the destination, or the like.

Figure 2:
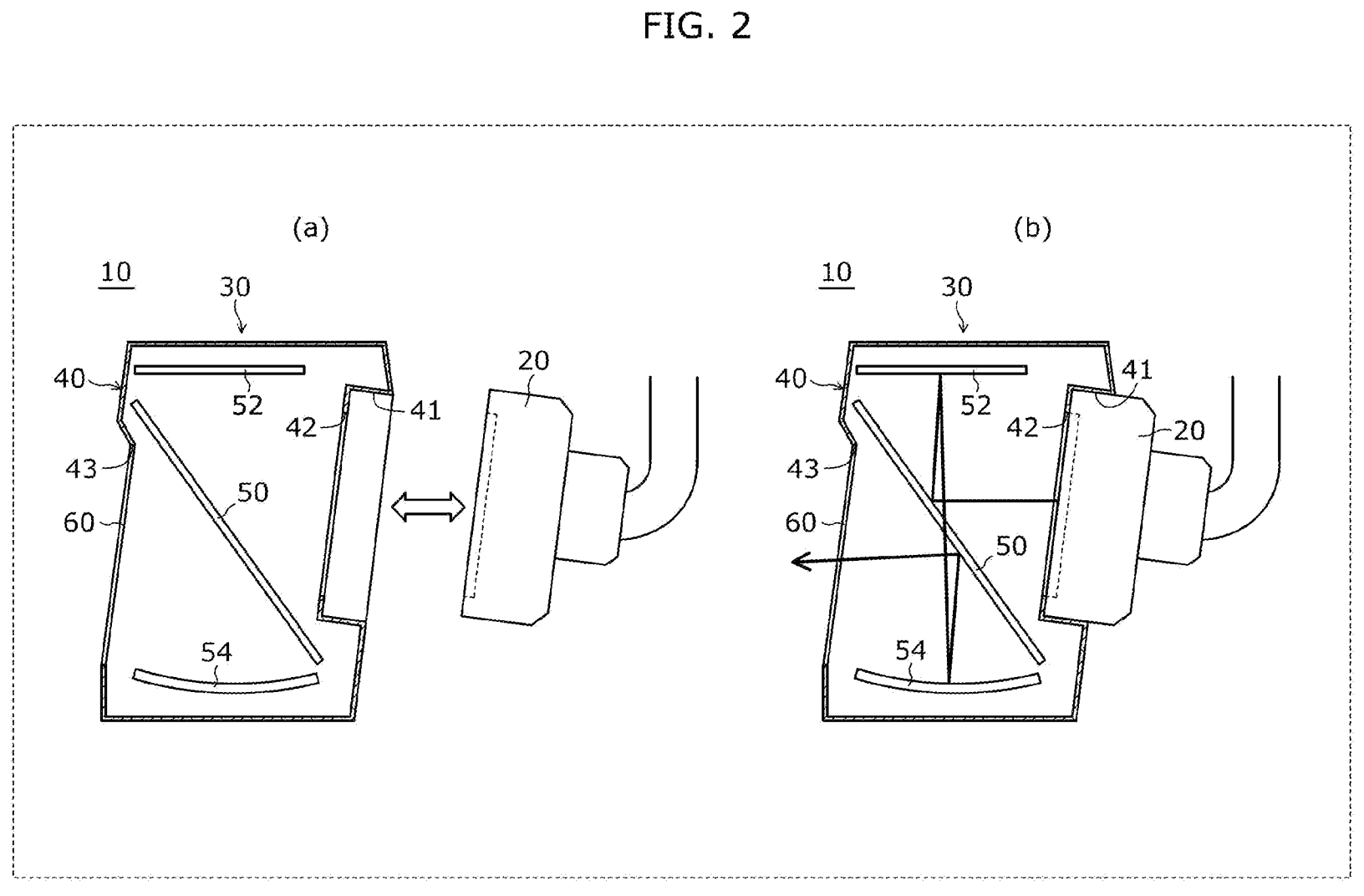

FIG. 2 illustrates display apparatus 10 in FIG. 1. In FIG. 2, (a) illustrates a state in which optical device 30 in display apparatus in FIG. 1 is dismounted from display 20, whereas (b) illustrates a state in which optical device 30 in display apparatus 10 in FIG. 1 is mounted on display 20. In FIG. 2, housing 40 is illustrated in cross section.

As illustrated in FIG. 2, display apparatus 10 includes display and optical device 30.

Display 20 emits light that represents an image. For example, display 20 emits light that represents the image captured by the camera that captures the image behind vehicle 1. For example, display 20 is implemented by including an LCD (Liquid Crystal Display), an organic EL (Electro Luminescence) display, or a micro LED (Light Emitting Diode) display. This embodiment will be described on the premise that display 20 is an LCD.

Optical device 30 includes housing 40, multiple mirrors, and light-transmitting cover 60. For example, optical device 30 is a device that can be detachably mounted on display 20 that is originally installed in vehicle 1.

Housing 40 is detachably mounted on display 20. Housing 40 includes mounting portion 41, entrance 42, and exit 43.

Mounting portion 41 is used for detachably mounting housing on display 20. In this embodiment, mounting portion 41 is recessed such that display 20 is removably fitted in mounting portion 41. As display 20 is fitted in mounting portion 41, housing 40 is mounted on display 20 (see (b) in FIG. 2).

Entrance 42 allows light emitted from display 20 to enter the interior of housing 40 with housing 40 mounted on display 20.

Entrance 42 is a through-hole that connects the spaces inside and outside housing 40. Entrance 42 faces display 20 with housing 40 mounted on display 20.

Exit 43 allows the light having entered the interior of housing through entrance 42 to exit to the exterior of housing 40. Exit 43 is a through-hole that connects the spaces inside and outside housing 40. Exit 43 faces entrance 42.

The multiple mirrors reflect the light having entered the interior of housing 40 through entrance 42 to exit 43. The multiple mirrors include half mirror 50, first mirror 52, and second mirror 54.

Half mirror 50 reflects the light having entered the interior of housing 40 through entrance 42 to first mirror 52. First mirror 52 reflects the light reflected by half mirror 50 to half mirror 50. Half mirror 50 transmits the light reflected by first mirror 52. Second mirror 54 reflects the light transmitted through half mirror 50 to half mirror 50. Half mirror 50 reflects the light reflected by second mirror 54 to exit 43.

For example, a quarter-wave retardation film, a reflective polarizing element, and the like are laminated on the surface of half mirror 50 facing exit 43. The transmission axis of the reflective polarizing element extends in a direction in which linearly polarized light emitted from display 20 (LCD) is reflected. A quarter-wave retardation film is disposed on the surface of first mirror 52. This allows half mirror 50 to reflect the light having entered the interior of housing 40 through entrance 42 to reflect to first mirror 52, to transmit the light reflected by first mirror 52 (the polarization axis of the light being rotated 90° as the light travels to and from the quarter-wave retardation film), and to reflect the light reflected by second mirror 54 (the transmission axis of the light being rotated 90° as the light travels to and from the quarter-wave retardation film on half mirror 50) to exit 43.

Moreover, for example, first mirror 52 is a plane mirror, and second mirror 54 is a concave mirror.

Light-transmitting cover 60 is disposed at exit 43 and transmits the light reflected by half mirror 50. For example, light-transmitting cover 60 is made of transparent glass or transparent resin.

The light having entered the interior of housing 40 through entrance 42 is reflected by half mirror 50, reflected by first mirror 52 after being reflected by half mirror 50, reflected by second mirror 54 after being reflected by first mirror 52 and transmitted through half mirror 50, and reflected by half mirror 50 after being reflected by second mirror 54 to exit to the exterior of housing 40 through exit 43 (see a thick line arrow in (b) in FIG. 2).

The length of an optical path extending from entrance 42 to exit 43 via the multiple mirrors is longer than the distance from exit 43 to display 20 when exit 43 is viewed from a side.

For example, when bringing the image displayed by display 20 that is originally installed in vehicle 1 into focus becomes difficult, mounting optical device 30 on display 20 can cause the image displayed by display 20 to be displayed farther as a virtual image, and thereby the image displayed by display 20 can be brought into focus easily.

Display apparatus 10 according to Embodiment 1 has been described above.

Optical device 30 according to Embodiment 1 includes housing and at least one mirror. Housing 40 can be detachably mounted on display 20 and includes entrance 42 that allows the light emitted from display 20 to enter the interior of housing 40 with housing 40 mounted on display 20 and exit 43 that allows the light having entered the interior of housing 40 through entrance 42 to exit to the exterior of housing 40. The at least one mirror reflects the light having entered the interior of housing 40 through entrance 42 to exit 43.

According to this, when bringing the image displayed by display 20 into focus becomes difficult, mounting housing 40 on display 20 can increase the length of the optical path of the light emitted from display 20 compared to before housing 40 is mounted on display 20. This allows the image displayed by display 20 to be displayed farther compared to before housing 40 is mounted on display 20, and thereby the image displayed by display 20 can be brought into focus easily.

Moreover, in optical device 30 according to Embodiment 1, the at least one mirror may include half mirror 50, first mirror 52, and second mirror 54. The light having entered the interior of housing through entrance 42 may be reflected by half mirror 50, reflected by first mirror 52 after being reflected by half mirror 50, reflected by second mirror 54 after being reflected by first mirror 52 and transmitted through half mirror 50, and reflected by half mirror 50 after being reflected by second mirror 54 to exit to the exterior of housing 40 through exit 43.

According to this, the length of the optical path of the light emitted from display 20 can be easily increased by reflecting the light having entered the interior of housing 40 through entrance 42 using half mirror 50, first mirror 52, and second mirror 54. This allows the image displayed by display 20 to be displayed farther easily compared to before housing 40 is mounted on display 20, and thereby the image displayed by display 20 can be brought into focus more easily.

Embodiment 2

Figure 3:
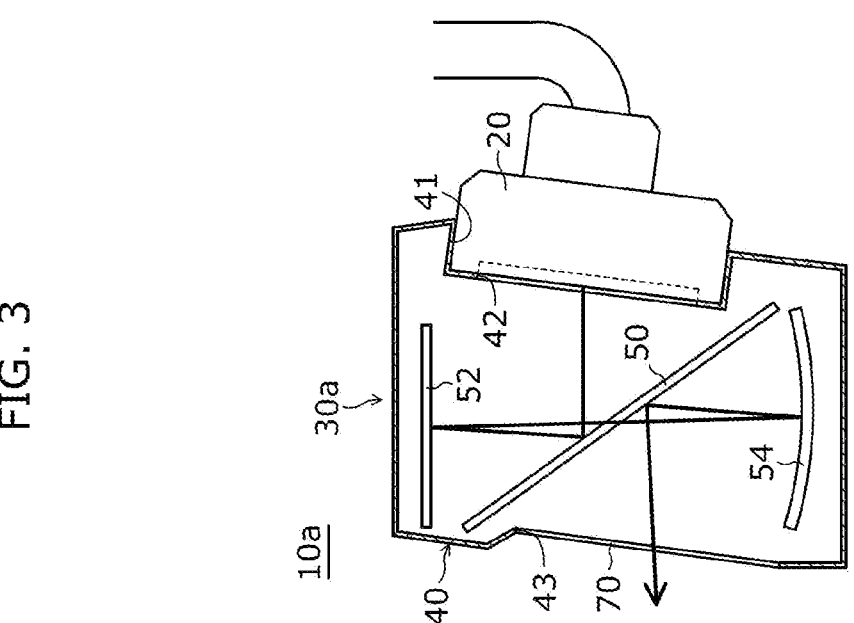
FIG. 3 illustrates a display apparatus according to Embodiment 2.

FIG. 3 illustrates display apparatus 10a according to Embodiment 2. FIG. 3 illustrates a state in which optical device 30a in display apparatus 10a according to Embodiment 2 is mounted on display 20. In FIG. 3, housing 40 is illustrated in cross section. As illustrated in FIG. 3, display apparatus 10a according to Embodiment 2 mainly differs from display apparatus 10 in including optical device 30a that differs from optical device 30.

Optical device 30a mainly differs from optical device 30 in including rearview mirror 70 instead of light-transmitting cover 60. Rearview mirror 70 is removably attached to exit 43. For example, when rearview mirror 70 is not attached to exit 43, the image displayed by display 20 is visible. On the other hand, attaching rearview mirror 70 to exit 43 enables the state behind vehicle 1 to be visible without using display 20.

Note that, for example, optical device 30a may include a liquid crystal mirror attached to exit 43 instead of light-transmitting cover 60. For example, switching the liquid crystal mirror to a transmission mode (turning the liquid crystal mirror on) enables the image displayed by display 20 to be visible. On the other hand, switching the liquid crystal mirror to a reflection mode (turning the liquid crystal mirror off) enables the state behind vehicle 1 to be visible without using display 20.

Display apparatus 10a according to Embodiment 2 has been described above.

Optical device 30a according to Embodiment 2 further includes rearview mirror 70 removably attached to exit 43 or the liquid crystal mirror attached to exit 43.

According to this, even when display 20 installed in vehicle 1 breaks down, rearview mirror 70 or the liquid crystal mirror enables the state behind vehicle 1 to be visible.

Embodiment 3

Figure 4:
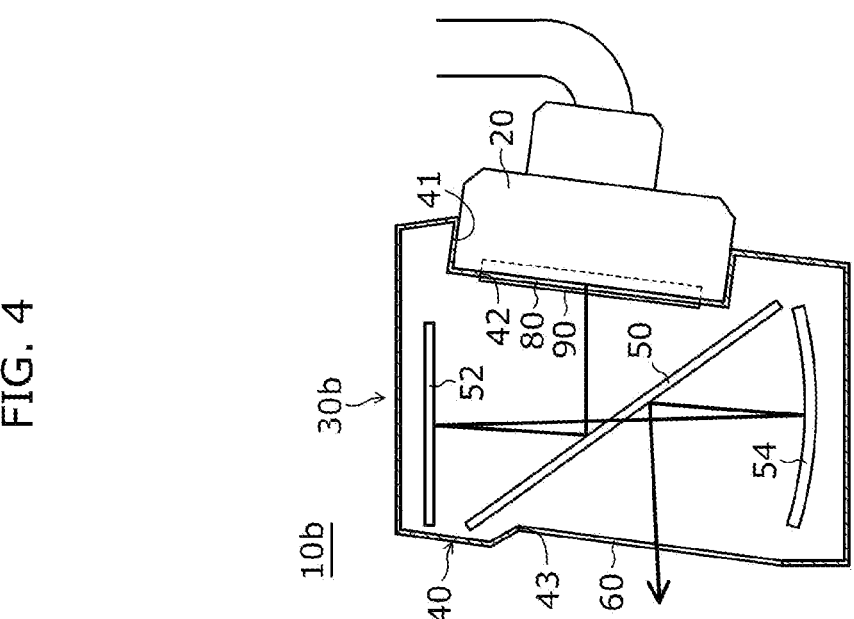
FIG. 4 illustrates a display apparatus according to Embodiment 3.

FIG. 4 illustrates display apparatus 10b according to Embodiment 3. FIG. 4 illustrates a state in which optical device 30b in display apparatus 10b according to Embodiment 3 is mounted on display 20. In FIG. 4, housing 40 is illustrated in cross section.

As illustrated in FIG. 4, display apparatus 10b according to Embodiment 3 mainly differs from display apparatus 10 in including optical device 30b that differs from optical device 30.

Optical device 30b mainly differs from optical device 30 in further including light-transmitting cover 80 and optical film 90.

Light-transmitting cover 80 is disposed at entrance 42 to face display 20 with housing 40 mounted on display 20.

Light-transmitting cover 80 transmits the light emitted from display 20. For example, light-transmitting cover 80 is made of transparent glass or transparent resin.

Optical film 90 is affixed to light-transmitting cover 80. For example, optical film 90 includes a polarizing film and a quarter-wave retardation film. According to this, in a case where the light emitted from display 20 is circularly polarized light, for example, the light can be converted into linearly polarized light. The linearly polarized light entering housing 40 can travel via half mirror 50, first mirror 52, and second mirror 54 along the optical path indicated by a thick line arrow in FIG. 4 to exit through light-transmitting cover 60.

Display apparatus 10b according to Embodiment 3 has been described above.

Optical device 30b according to Embodiment 3 further includes light-transmitting cover 80 disposed at entrance 42 to face display with housing 40 mounted on display 20.

This prevents dust and the like from entering the interior of housing 40 through entrance 42.

Moreover, optical device 30b according to Embodiment 3 further includes optical film 90 affixed to light-transmitting cover 80.

According to this, the vibration direction and the like of the light emitted from display 20 can be easily changed. Thus, the light can be easily reflected, and the image displayed by display 20 can be brought into focus more easily.

Embodiment 4

Figure 5:
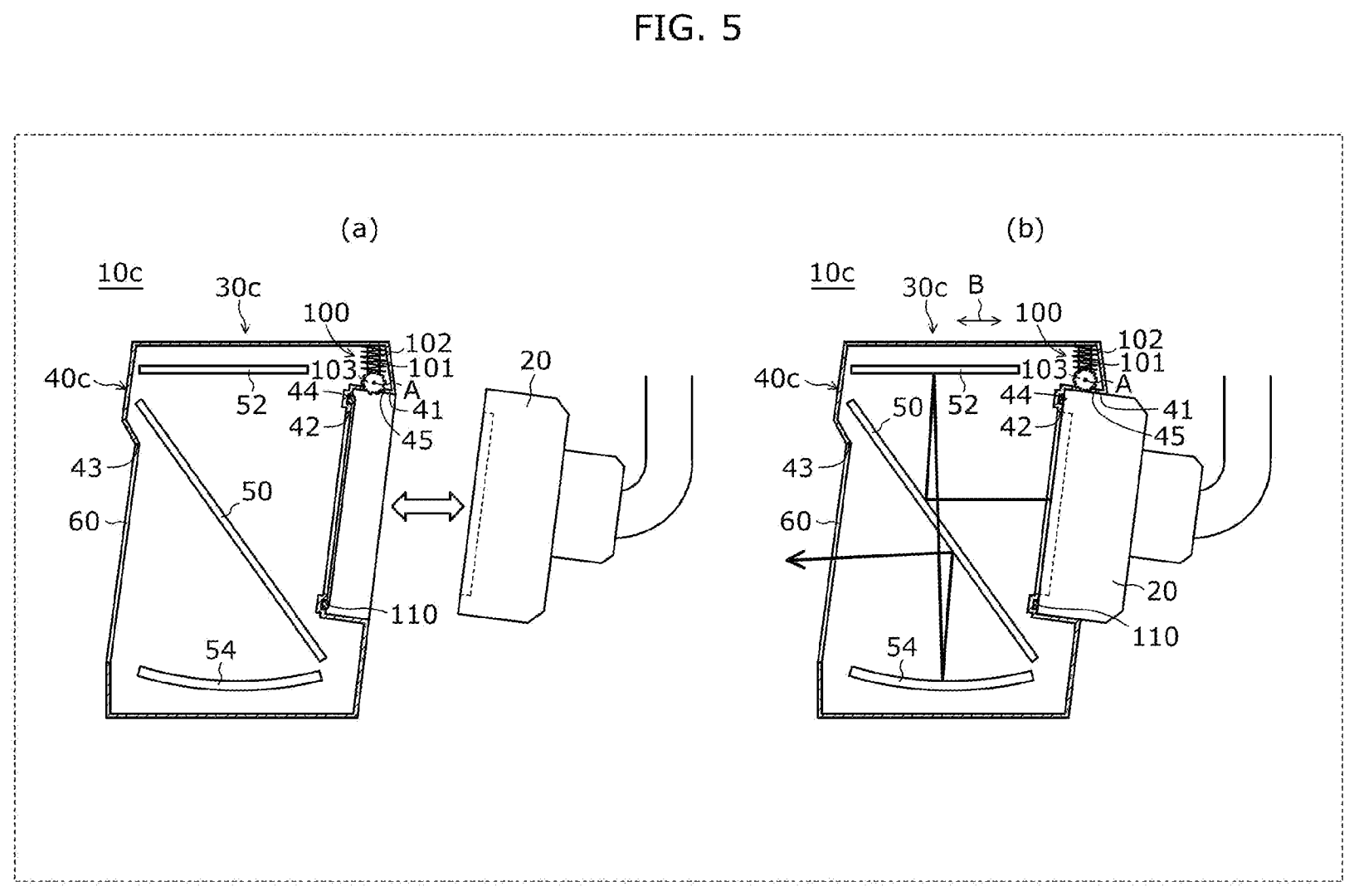

FIG. 5 illustrates display apparatus 10c according to Embodiment 4. In FIG. 5, (a) illustrates a state in which optical device 30c in display apparatus 10c according to Embodiment 4 is dismounted from display 20, whereas (b) illustrates a state in which optical device 30c in display apparatus 10c according to Embodiment 4 is mounted on display 20. In FIG. 5, housing 40c is illustrated in cross section.

As illustrated in FIG. 5, display apparatus 10c according to Embodiment 4 mainly differs from display apparatus 10 in including optical device 30c that differs from optical device 30.

Optical device 30c mainly differs from optical device 30 in including housing 40c that differs from housing 40 and in further including position adjuster 100 and rubber component 110.

Housing 40c mainly differs from housing 40 in further having recess 44 and through-hole 45.

Recess 44 has a rectangular ring shape and is provided around the perimeter of entrance 42 to surround entrance 42.

Through-hole 45 faces the upper end face of display 20 with housing 40c mounted on display 20. Note that, for example, through-hole may face an other end face, such as lower end face, of display 20 with housing 40c mounted on display 20.

Figure 6:
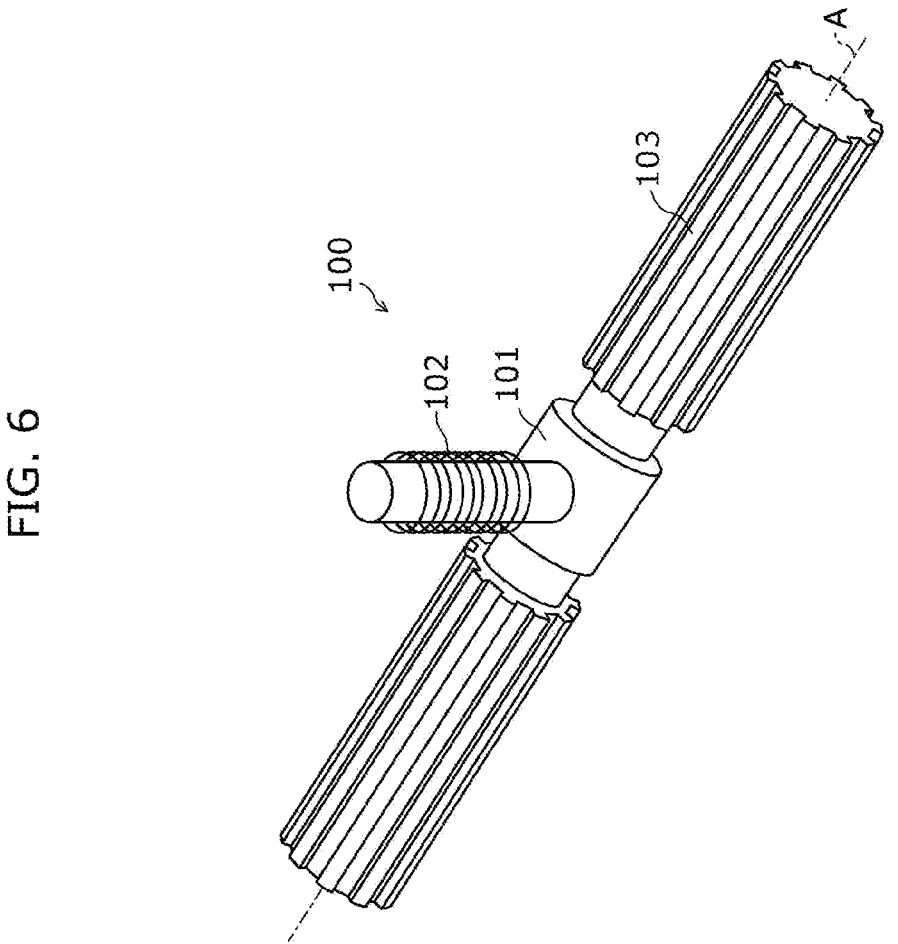
FIG. 6 is a perspective view of a position adjuster in the display apparatus in FIG. 5.

Position adjuster 100 is used for adjusting the position of housing 40c relative to display 20 with housing 40c mounted on display 20. FIG. 6 is a perspective view of position adjuster 100 in display apparatus 10c in FIG. 5. As illustrated in FIGS. 5 and 6, position adjuster 100 includes support member 101, biasing member 102, and rotating member 103.

Support member 101 supports rotating member 103 such that rotating member 103 is rotatable around axis A extending in a direction intersecting the direction in which display 20 emits the light.

Biasing member 102 biases support member 101 to display 20 with housing 40c mounted on display 20. For example, biasing member 102 is a spring.

Rotating member 103 is exposed through through-hole 45 to abut on the upper end face of display 20 and is biased to display 20 together with support member 101 with housing 40c mounted on display 20. Rotating member 103 protrudes to the exterior of housing 40c in a direction of axis A. For example, the part of rotating member 103 abutting on display 20 is made of, for example, rubber.

As driver 2 rotates rotating member 103 around axis A with housing 40c mounted on display 20, housing 40c moves relative to display 20 (see arrow B in (b) in FIG. 5). Accordingly, the position of housing 40c can be adjusted relative to display 20. This enables adjustment of the distance or the like between display 20 and entrance 42.

Rubber component 110 has a ring shape and is disposed around the perimeter of entrance 42 to abut on display 20 with housing 40c mounted on display 20. Rubber component 110 is fitted in recess 44. With housing 40c mounted on display 20, rubber component 110 is sandwiched between housing 40c and display 20 to be in firm contact with housing 40c and display 20. Rubber component 110 may be, for example, an O-ring having a substantially quadrangular shape.

Display apparatus 10c according to Embodiment 4 has been described above.

Optical device 30c according to Embodiment 4 further includes position adjuster 100 for adjusting the position of housing 40c relative to display 20 with housing 40c mounted on display 20.

According to this, the length of the optical path of the light emitted from display 20 can be easily adjusted. Thus, the image displayed by display 20 can be brought into focus more easily.

Moreover, optical device 30c according to Embodiment 4 further includes rubber component 110 having a ring shape and disposed around the perimeter of entrance 42 to abut on display 20 with housing 40c mounted on display 20.

This prevents dust and the like from entering the interior of housing 40c through entrance 42 with housing 40c mounted on display 20.

Embodiment 5

Figure 7:
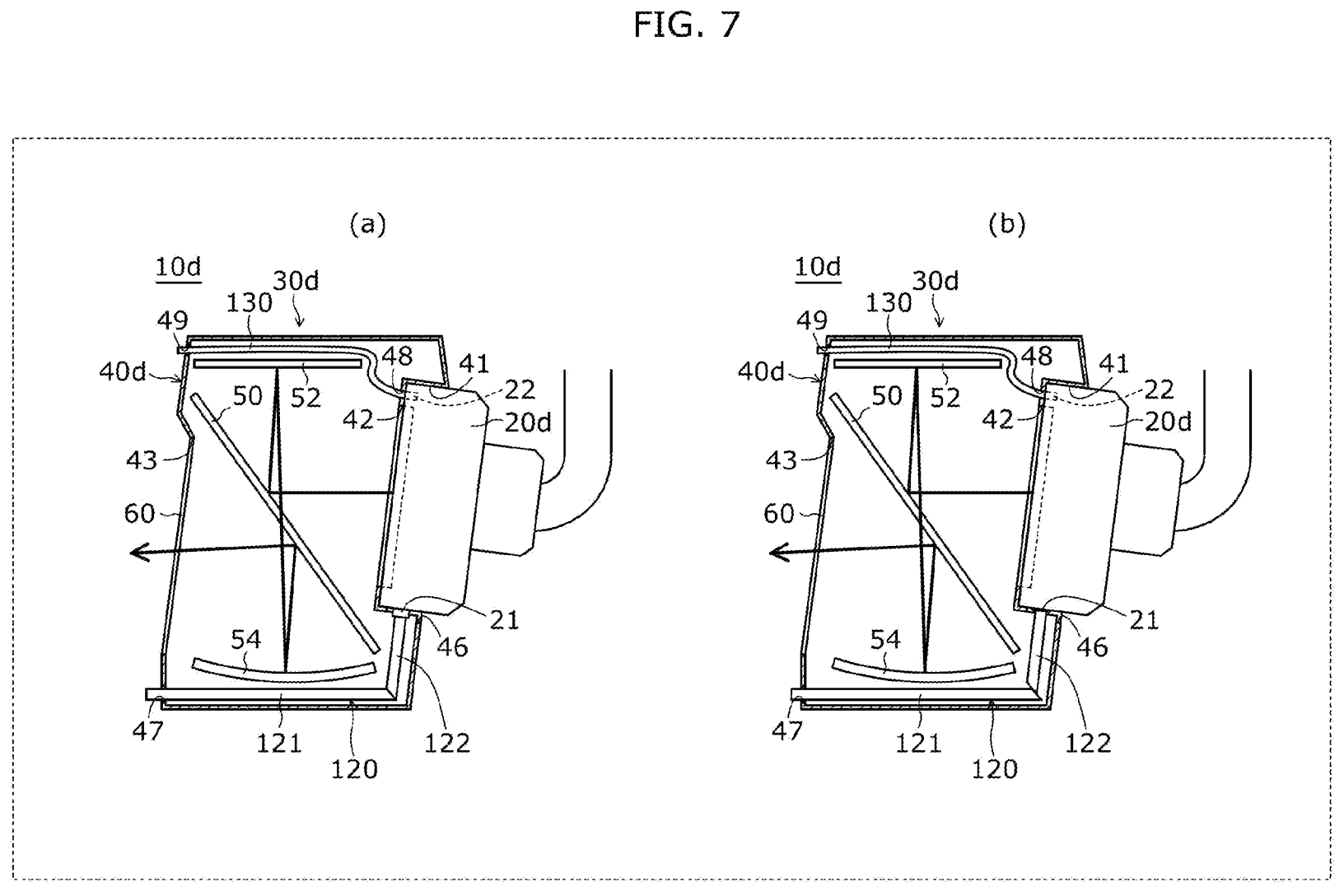

FIG. 7 illustrates display apparatus 10*d* according to Embodiment 5. In FIG. 7, (a) illustrates a state in which operation portion 120 in display apparatus 10*d* according to Embodiment 5 is not operated, whereas (b) illustrates a state in which operation portion 120 in display apparatus 10*d* according to Embodiment 5 is operated. In FIG. 7, housing 40*d* is illustrated in cross section.

As illustrated in FIG. 7, display apparatus 10*d* according to Embodiment 5 mainly differs from display apparatus 10 in including display 20*d* that differs from display 20 and optical device 30*d* that differs from optical device 30.

Display device 20*d* mainly differs from display device 20 in including switch 21 and optical sensor 22.

Switch 21 is used for operating display 20*d*. For example, switch 21 is used for switching the image displayed by display 20*d*.

Optical sensor 22 is a sensor that detects light outside display 20*d*. For example, the brightness of light emitted from display 20*d* is determined according to the result of detection by optical sensor 22.

Optical device 30*d* mainly differs from optical device 30 in including housing 40*d* that differs from housing 40 and in further including operation portion 120 and light guide 130. Light guide 130 may be an optical fiber or a molded product made of transparent resin.

Housing 40*d* mainly differs from housing 40 in further having multiple through-holes 46, 47, 48, and 49.

Through-hole 46 is a through-hole through which switch 21 is exposed to the interior of housing 40*d* with housing 40*d* mounted on display 20*d*.

Through-hole 47 is a through-hole through which operation portion 120 is placed such that operation portion 120 partially protrudes to the exterior of housing 40*d*.

Through-hole 48 is a through-hole through which optical sensor 22 is exposed to the interior of housing 40*d* with housing 40*d* mounted on display 20*d*.

Through-hole 49 is a through-hole through which light guide 130 is placed such that light guide 130 is exposed to the exterior of housing 40*d*.

Operation portion 120 is used for operating switch 21 provided for display 20*d* with housing 40*d* mounted on display 20*d*. Operation portion 120 includes first member 121 and second member 122.

First member 121 is disposed to be slidable inside housing 40*d* and partially protrudes to the exterior of housing 40*d*. Second member 122 is disposed to be slidable inside housing 40*d* and slides as first member 121 slides.

When first member 121 is pushed to the back with housing 40*d* mounted on display 20*d*, second member 122 slides upward and pushes switch 21. Switch 21 is operated in this manner.

As described above, first member 121 can be pushed in the depth direction of housing 40*d*. For example, the depth direction of housing 40*d* is a direction opposite the direction in which the light emitted from display 20*d* exits from exit 43 and is a direction extending from exit 43 to entrance 42. Moreover, with housing 40*d* mounted on display 20*d*, second member 122 moves in an intersecting direction that intersects the depth direction of housing 40*d* to push switch 21 when first member 121 is pushed in the depth direction. Here, when first member 121 is pushed to the depth direction of housing 40*d* with housing 40*d* mounted on display 20*d*, second member 122 moves vertically upward to push switch

21. That is, here, the intersecting direction extends vertically upward and downward with housing 40*d* mounted on display 20*d*.

Note that second member 122 may be configured to be freely movable in the vertical direction of housing 40*d* with housing 40*d* dismounted from display 20*d*. For example, second member 122 may be movable in the intersecting direction that intersects the depth direction of housing 40*d* with housing 40*d* dismounted from display 20*d*. For example, second member 122 may be movable in the intersecting direction that intersects the depth direction of housing 40*d* such that, when housing 40*d* is placed upside down relative to the position illustrated in FIG. 7, second member 122 moves vertically downward by gravity and stops in a state in which second member 122 protrudes vertically downward. For example, second member 122 may include a protrusion (not illustrated) to be caught by housing 40*d* to stop in the state in which second member 122 protrudes vertically downward. According to this, when housing 40*d* is to be mounted on display 20*d* upside down relative to the position illustrated in FIG. 7, second member 122 comes into contact with display 20*d* to prevent housing 40*d* from being mounted on display 20*d*.

Light guide 130 is a light guide element that guides light to optical sensor 22 provided for display 20*d* with housing 40*d* mounted on display 20*d*. Specifically, light guide 130 is exposed to the exterior of housing 40*d* and guides the light outside housing 40*d* to optical sensor 22.

Display apparatus 10*d* according to Embodiment 5 has been described above.

In optical device 30*d* according to Embodiment 5, display 20*d* includes switch 21 for operating display 20*d*, and optical device 30*d* further includes operation portion 120 for operating switch 21 with housing 40*d* mounted on display 20*d*.

According to this, even with housing 40*d* mounted on display 20*d*, switch 21 provided for display 20*d* can be operated.

Moreover, in optical device 30*d* according to Embodiment 5, operation portion 120 includes first member 121 that can be pushed in the depth direction of housing 40*d* and second member 122 that moves in the intersecting direction intersecting the depth direction to push switch 21 when first member 121 is pushed in the depth direction with housing 40*d* mounted on display 20*d*, and second member 122 is movable in the intersecting direction with housing 40*d* dismounted from display 20*d*.

According to this, when housing 40*d* is to be mounted on display 20*d* upside down, for example, second member 122 protrudes downward by gravity. Accordingly, second member 122 comes into contact with display 20*d* to prevent housing 40*d* from being mounted on display 20*d*. This reduces the possibility that housing 40*d* is mounted upside down.

Moreover, in optical device 30*d* according to Embodiment 5, display 20*d* includes optical sensor 22 that detects the light outside display 20*d*, and optical sensor 30*d* further includes light guide 130 that guides light to optical sensor 22 with housing 40*d* mounted on display 20*d*.

According to this, even with housing 40*d* mounted on display 20*d*, light can be guided to optical sensor 22 provided for display 20*d*.

Embodiment 6

Figure 8:
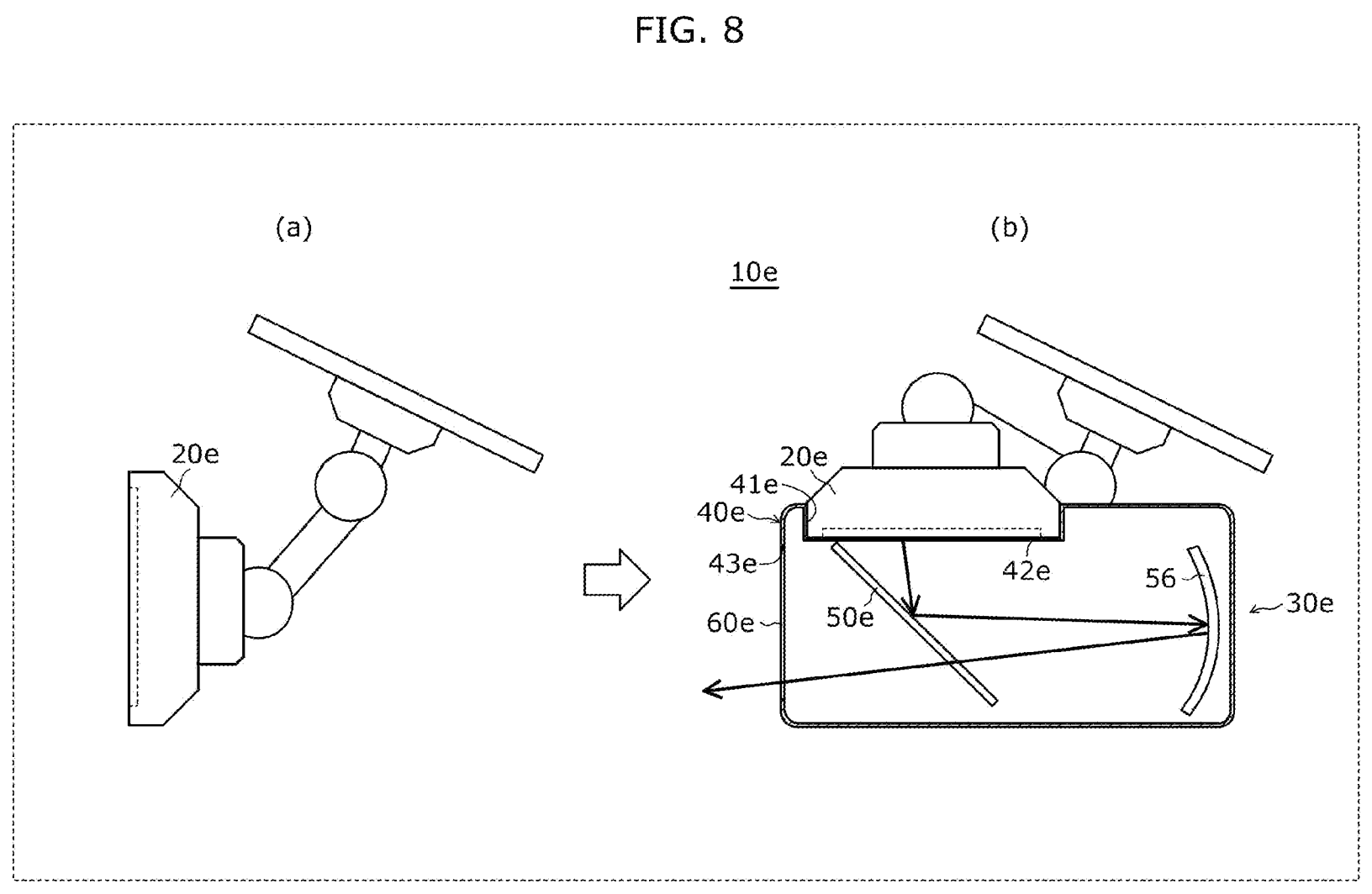

FIG. 8 illustrates display apparatus 10*e* according to Embodiment 6. In FIG. 8, (a) illustrates display 20*e* in display apparatus 10*e* according to Embodiment 6, whereas (b) illustrates a state in which optical device 30e in display apparatus 10e according to Embodiment 6 is mounted on display 20e. In FIG. 8, housing 40e is illustrated in cross section.

As illustrated in FIG. 8, display apparatus 10e includes display 20e and optical device 30e.

Display 20e mainly differs from display 20 in being pivotable such that the direction in which the light is emitted can be changed by, for example, 90 degrees.

Optical device 30e includes housing 40e, multiple mirrors, and light-transmitting cover 60e.

Housing 40e is detachably mounted on display 20e. Housing 40e includes mounting portion 41e, entrance 42e, and exit 43e. Mounting portion 41e is used for detachably mounting housing 40e on display 20e. In this embodiment, mounting portion 41e is recessed such that display 20e is removably fitted in mounting portion 41e. That is, as display 20e is fitted in mounting portion 41e, housing 40e is mounted on display 20e (see (b) in FIG. 8). Entrance 42e allows light emitted from display 20e to enter the interior of housing 40e with housing 40e mounted on display 20e. Entrance 42e is a through-hole that connects the spaces inside and outside housing 40e. Entrance 42e faces display 20e with housing 40e mounted on display 20e.

Exit 43e allows the light having entered the interior of housing 40e through entrance 42e to exit to the exterior of housing 40e. Exit 43e is a through-hole that connects the spaces inside and outside housing 40e.

The multiple mirrors reflect the light having entered the interior of housing 40e through entrance 42e to exit 43e. The multiple mirrors include half mirror 50e and concave mirror 56.

Half mirror 50e reflects the light having entered the interior of housing 40e through entrance 42e to concave mirror 56. Concave mirror 56 reflects the light reflected by half mirror 50e to half mirror 50e. Half mirror 50e transmits the light reflected by concave mirror 56.

For example, a quarter-wave retardation film is affixed to the screen of display 20e, and half mirror 50e is formed by laminating a quarter-wave retardation film, a reflective polarizing element, and the like. This allows half mirror 50e to reflect the light having entered the interior of housing 40e through entrance 42e to concave mirror 56 and to transmit the light reflected by concave mirror 56.

Light-transmitting cover 60e is disposed at exit 43e and transmits the light transmitted through half mirror 50e. For example, light-transmitting cover 60e is made of transparent glass or transparent resin.

The light having entered the interior of housing 40e through entrance 42e is reflected by half mirror 50e, reflected by concave mirror 56 after being reflected by half mirror 50e, and transmitted through half mirror 50e after being reflected by concave mirror 56 to exit to the exterior of housing 40e through exit 43e (see a thick line arrow in (b) in FIG. 8).

For example, when bringing the image displayed by display 20e that is originally installed in vehicle 1 into focus becomes difficult, mounting optical device 30e on display 20e can cause the image displayed by display 20e to be displayed farther, and thereby the image displayed by display 20e can be brought into focus easily.

Display apparatus 10e according to Embodiment 6 has been described above.

In optical device 30e according to Embodiment 6, at least one mirror includes half mirror 50e and concave mirror 56. The light having entered the interior of housing 40e through entrance 42e is reflected by half mirror 50e, reflected by concave mirror 56 after being reflected by half mirror 50e, and transmitted through half mirror 50e after being reflected by concave mirror 56 to exit to the exterior of housing 40e through exit 43e.

According to this, the length of the optical path of the light emitted from display 20e can be easily increased by reflecting the light having entered the interior of housing 40e through entrance 42e using half mirror 50e and concave mirror 56. This allows the image displayed by display 20e to be displayed farther easily compared to before housing 40e is mounted on display 20e, and thereby the image displayed by display 20e can be brought into focus more easily.

Embodiment 7

Figure 9:
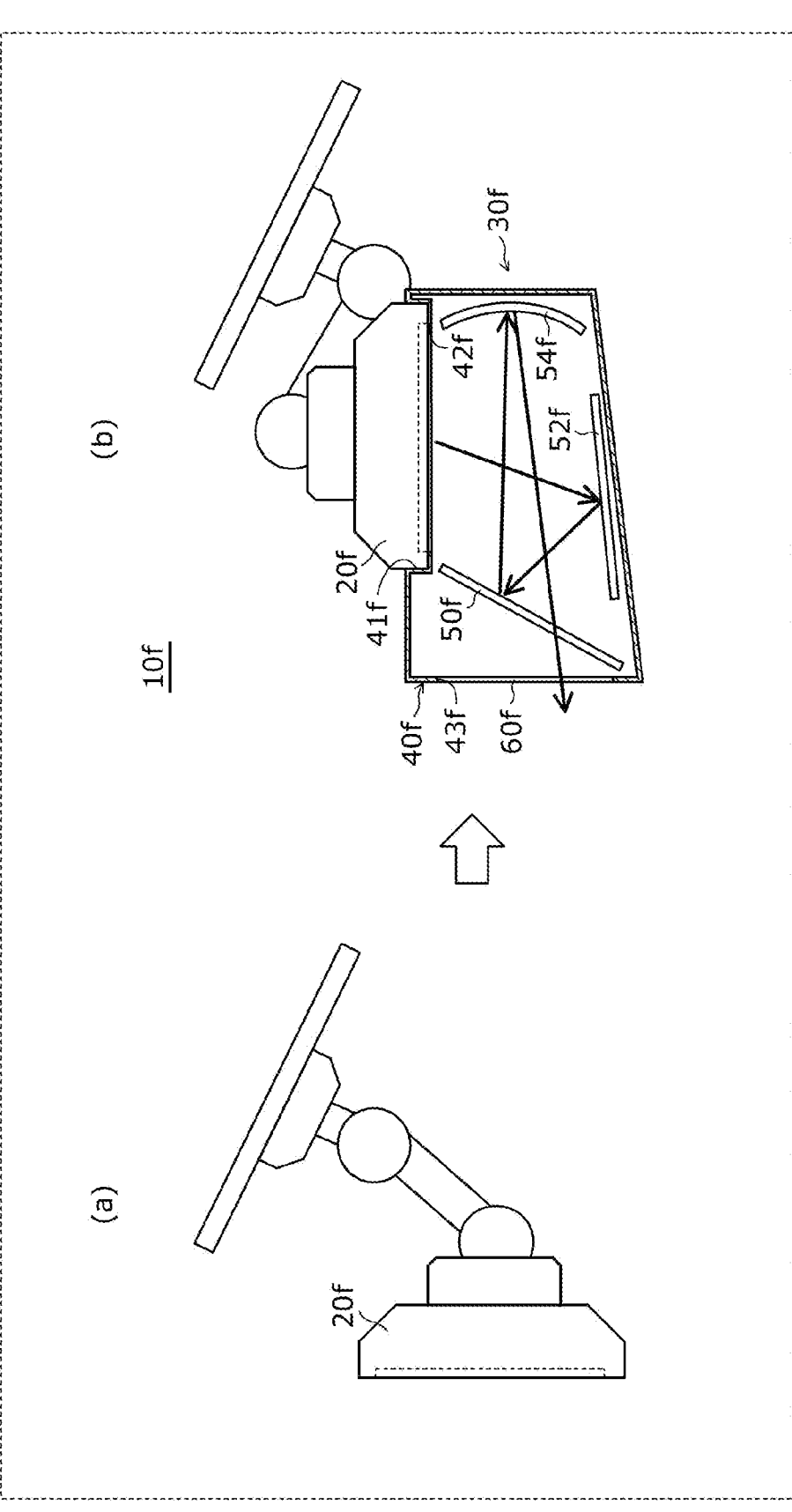
FIG. 9 illustrates a display apparatus according to Embodiment 7.

FIG. 9 illustrates display apparatus 10f according to Embodiment 7. In FIG. 9, (a) illustrates display 20f in display apparatus 10f according to Embodiment 7, whereas (b) illustrates a state in which optical device 30f in display apparatus 10f according to Embodiment 7 is mounted on display 20f. In FIG. 9, housing 40f is illustrated in cross section.

As illustrated in FIG. 9, display apparatus 10f includes display 20f and optical device 30f.

Display 20f mainly differs from display 20 in being pivotable such that the direction in which the light is emitted can be changed by, for example, 90 degrees.

Optical device 30f includes housing 40f, multiple mirrors, and light-transmitting cover 60f.

Housing 40f is detachably mounted on display 20f. Housing 40f includes mounting portion 41f, entrance 42f, and exit 43f.

Mounting portion 41f is used for detachably mounting housing 40f on display 20f. In this embodiment, mounting portion 41f is recessed such that display 20f is removably fitted in mounting portion 41f. That is, as display 20f is fitted in mounting portion 41f, housing 40f is mounted on display 20f (see (b) in FIG. 9).

Entrance 42f allows light emitted from display 20f to enter the interior of housing 40f with housing 40f mounted on display 20f. Entrance 42f is a through-hole that connects the spaces inside and outside housing 40f. Entrance 42f faces display 20f with housing 40f mounted on display 20f.

Exit 43f allows the light having entered the interior of housing 40f through entrance 42f to exit to the exterior of housing 40f. Exit 43f is a through-hole that connects the spaces inside and outside housing 40f.

The multiple mirrors reflect the light having entered the interior of housing 40f through entrance 42f to exit 43f. The multiple mirrors include half mirror 50f, first mirror 52f, and second mirror 54f.

First mirror 52f reflects the light having entered the interior of housing 40f through entrance 42f to half mirror 50f. Half mirror 50f reflects the light reflected by first mirror 52f to second mirror 54f. Second mirror 54f reflects the light reflected by half mirror 50f to half mirror 50f. Half mirror 50f transmits the light reflected by second mirror 54f.

For example, a quarter-wave retardation film is affixed to the screen of display 20f, and half mirror 50f is formed by laminating a quarter-wave retardation film, a reflective polarizing element, and the like. This allows half mirror 50f to reflect the light reflected by first mirror 52f to second mirror 54f and to transmit the light reflected by second mirror 54f.

Light-transmitting cover 60*f* is disposed at exit 43*f* and transmits the light transmitted through half mirror 50*f*. For example, light-transmitting cover 60*f* is made of transparent glass or transparent resin.

The light having entered the interior of housing 40*f* through entrance 42*f* is reflected by first mirror 52*f*, reflected by half mirror 50*f* after being reflected by first mirror 52*f*, reflected by second mirror 54*f* after being reflected by half mirror 50*f*, and transmitted through half mirror 50*f* after being reflected by second mirror 54*f* to exit to the exterior of housing 40*f* through exit 43*f* (see a thick line arrow in (b) in FIG. 9).

For example, when bringing the image displayed by display 20*f* that is originally installed in vehicle 1 into focus becomes difficult, mounting optical device 30*f* on display 20*f* can cause the image displayed by display 20*f* to be displayed farther, and thereby the image displayed by display 20*f* can be brought into focus easily.

Display apparatus 10*f* according to Embodiment 7 has been described above.

In optical device 30*f* according to Embodiment 7, at least one mirror includes half mirror 50*f*, first mirror 52*f*, and second mirror 54*f*. The light having entered the interior of housing 40*f* through entrance 42*f* is reflected by first mirror 52*f*, reflected by half mirror 50*f* after being reflected by first mirror 52*f*, reflected by second mirror 54*f* after being reflected by half mirror 50*f*, and transmitted through half mirror 50*f* after being reflected by second mirror 54*f* to exit to the exterior of housing 40*f* through exit 43*f*.

According to this, the length of the optical path of the light emitted from display 20*f* can be easily increased by reflecting the light having entered the interior of housing 40*f* through entrance 42*f* using half mirror 50*f*, first mirror 52*f*, and second mirror 54*f*. This allows the image displayed by display 20*f* to be displayed farther easily compared to before housing 40*f* is mounted on display 20*f*, and thereby the image displayed by display 20*f* can be brought into focus more easily.

Embodiment 8

Figure 10:
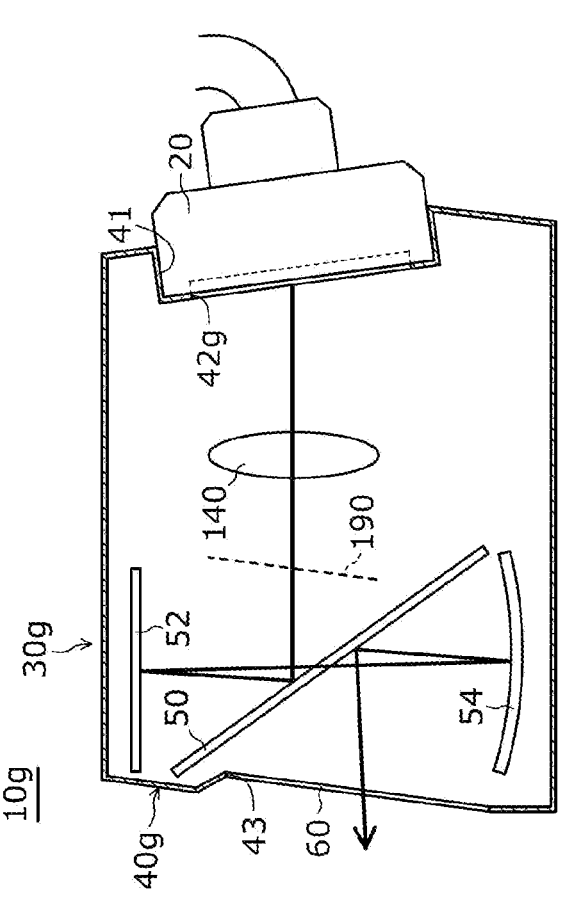
FIG. 10 illustrates a display apparatus according to Embodiment 8.

FIG. 10 illustrates display apparatus 10*g* according to Embodiment 8. FIG. 10 illustrates a state in which optical device 30*g* in display apparatus 10*g* according to Embodiment 8 is mounted on display 20. In FIG. 10, housing 40*g* is illustrated in cross section. As illustrated in FIG. 10, display apparatus 10*g* according to Embodiment 8 mainly differs from display apparatus 10 in including optical device 30*g* that differs from optical device 30.

Optical device 30*g* mainly differs from optical device 30 in including housing 40*g* that differs from housing 40 and in further including convex lens 140.

Housing 40*g* is larger than housing 40 such that distances between display 20 and the multiple mirrors with housing 40*g* mounted on display 20 are longer than distances between display 20 and the multiple mirrors with housing 40 mounted on display 20 to accommodate convex lens 140.

Convex lens 140 is disposed on the optical path extending from entrance 42*g* to a mirror (half mirror 50). The light having entered the interior of housing 40*g* through entrance 42*g* is reflected by half mirror 50 after being transmitted through convex lens 140. Convex lens 140 shrinks the image (light) having entered the interior of housing 40*g* through entrance 42*g* and forms intermediate image 190.

Note that, as illustrated in FIG. 10, the upper end of intermediate image 190 is inclined to the right (toward display 20) with respect to the vertical direction of housing

40*g*. That is, intermediate image 190 is inclined as is entrance 42 in FIG. 2, for example. To incline intermediate image 190 in this manner, entrance 42*g* in FIG. 10 is inclined counterclockwise with respect to entrance 42 in FIG. 2.

The multiple mirrors enlarge intermediate image 190 resulting from the light shrunk by convex lens 140. In this embodiment, second mirror 54 is a concave mirror and enlarges intermediate image 190 shrunk by convex lens 140. Note that convex lens 140, which is illustrated as a single lens, may be a lens formed by combining multiple lenses.

Display apparatus 10*g* according to Embodiment 8 has been described above.

Optical device 30*g* according to Embodiment 8 further includes convex lens 140 disposed on the optical path extending from entrance 42*g* to at least one mirror (half mirror 50). Convex lens 140 shrinks the light having entered the interior of housing 40*g* through entrance 42*g*, and at least one mirror (second mirror 54) enlarges the light (intermediate image 190) shrunk by convex lens 140.

According to this, the light (intermediate image 190) is shrunk and is then enlarged, increasing the resolution of the virtual image.

Embodiment 9

Figure 11:
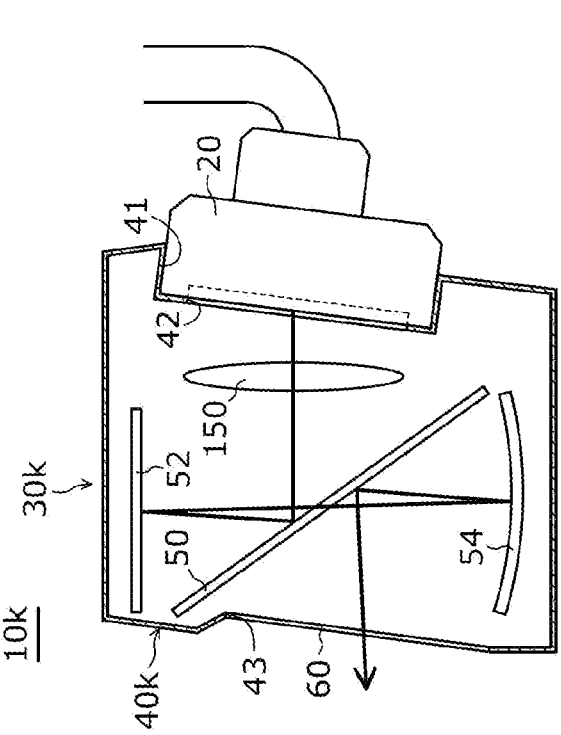
FIG. 11 illustrates a display apparatus according to Embodiment 9.

FIG. 11 illustrates display apparatus 10*k* according to Embodiment 9. FIG. 11 illustrates a state in which optical device 30*k* in display apparatus 10*k* according to Embodiment 9 is mounted on display 20. In FIG. 11, housing 40*k* is illustrated in cross section.

As illustrated in FIG. 11, display apparatus 10*k* according to Embodiment 9 mainly differs from display apparatus 10 in including optical device 30*k* that differs from optical device 30.

Optical device 30*k* mainly differs from optical device 30 in including housing 40*k* that differs from housing 40 and in further including convex lens 150.

Housing 40*k* is larger than housing 40 such that distances between display 20 and the multiple mirrors with housing 40*k* mounted on display 20 are longer than distances between display 20 and the multiple mirrors with housing 40 mounted on display 20 to accommodate convex lens 150.

Convex lens 150 is disposed on the optical path extending from entrance 42 to exit 43. In this embodiment, convex lens 150 is disposed between entrance 42 and half mirror 50, and the light having entered the interior of housing 40*k* through entrance 42 is reflected by half mirror 50 after being transmitted through convex lens 150. Note that convex lens 150 may be disposed at any position on the optical path extending from entrance 42 to exit 43. Display apparatus 10*k* according to Embodiment 9 has been described above.

Optical device 30*k* according to Embodiment 9 further includes convex lens 150 disposed on the optical path extending from entrance 42 to exit 43.

This allows the image displayed by display 20 to be displayed farther easily compared to before housing 40*k* is mounted on display 20, and thereby the image displayed by display 20 can be brought into focus more easily.

Embodiment 10

Figure 12:
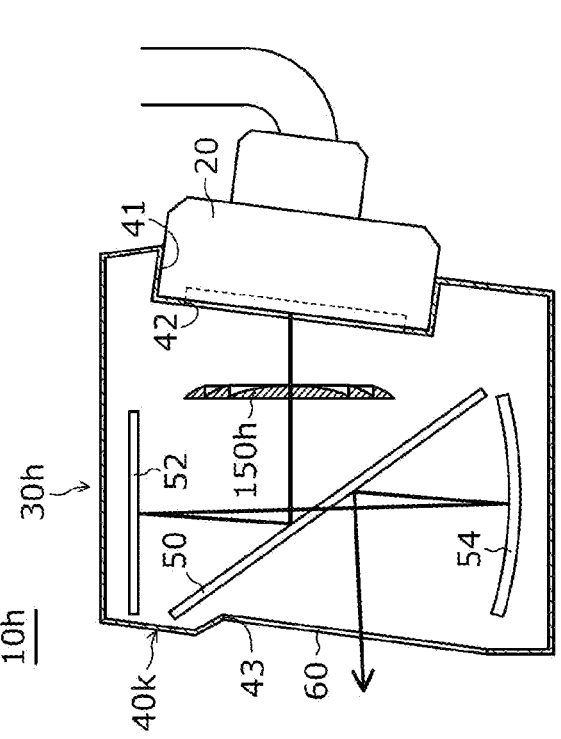
FIG. 12 illustrates a display apparatus according to Embodiment 10.

FIG. 12 illustrates display apparatus 10*h* according to Embodiment 10. FIG. 12 illustrates a state in which optical device 30*h* in display apparatus 10*h* according to Embodiment 10 is mounted on display 20. In FIG. 12, housing 40*k* and convex lens 150*h* are illustrated in cross section.

As illustrated in FIG. 12, display apparatus 10*h* according to Embodiment 10 mainly differs from display apparatus 10*k* in including optical device 30*h* that differs from optical device 30*k*.

Optical device 30*h* mainly differs from optical device 30*k* in including convex lens 150*h* that differs from convex lens 150.

Convex lens 150*h* is a Fresnel lens. One main surface of convex lens 150*h* has a substantially saw-like section.

Display apparatus 10*h* according to Embodiment 10 has been described above.

In optical device 30*h* according to Embodiment 10, convex lens 150*h* is a Fresnel lens.

This brings the image displayed by display 20 into focus easily while preventing optical device 30*h* from increasing in size.

Embodiment 11

Figure 13:
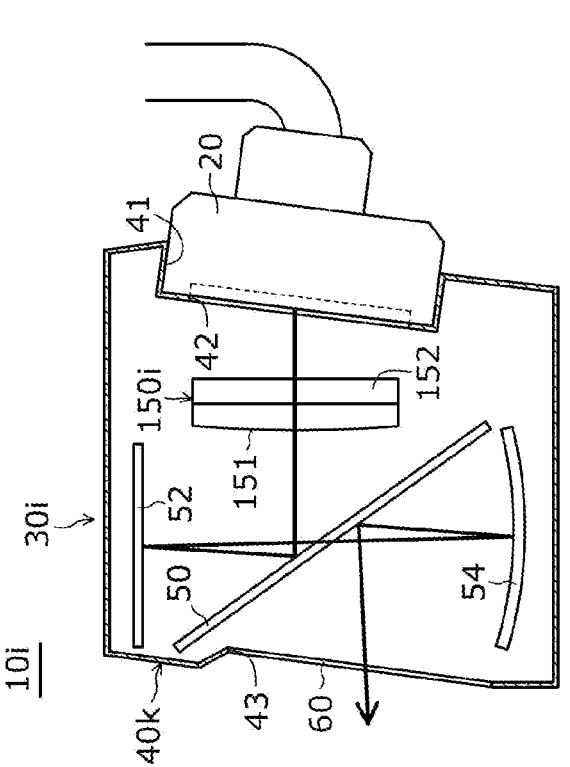
FIG. 13 illustrates a display apparatus according to Embodiment 11.

FIG. 13 illustrates display apparatus 10*i* according to Embodiment 11. FIG. 13 illustrates a state in which optical device 30*i* in display apparatus 10*i* according to Embodiment 11 is mounted on display 20. In FIG. 13, housing 40*k* is illustrated in cross section.

As illustrated in FIG. 13, display apparatus 10*i* according to Embodiment 11 mainly differs from display apparatus 10*k* in including optical device 30*i* that differs from optical device 30*k*.

Optical device 30*i* mainly differs from optical device 30*k* in including convex lens 150*i* that differs from convex lens 150.

Each of one main surface 151 and other main surface 152 of convex lens 150*i* is a cylindrical surface. That is, convex lens 150*i* is a so-called cylindrical lens. In this embodiment, convex lens 150*i* is disposed such that the light emitted from display 20 enters convex lens 150*i* through other main surface 152 and exits through one main surface 151.

Figure 14:
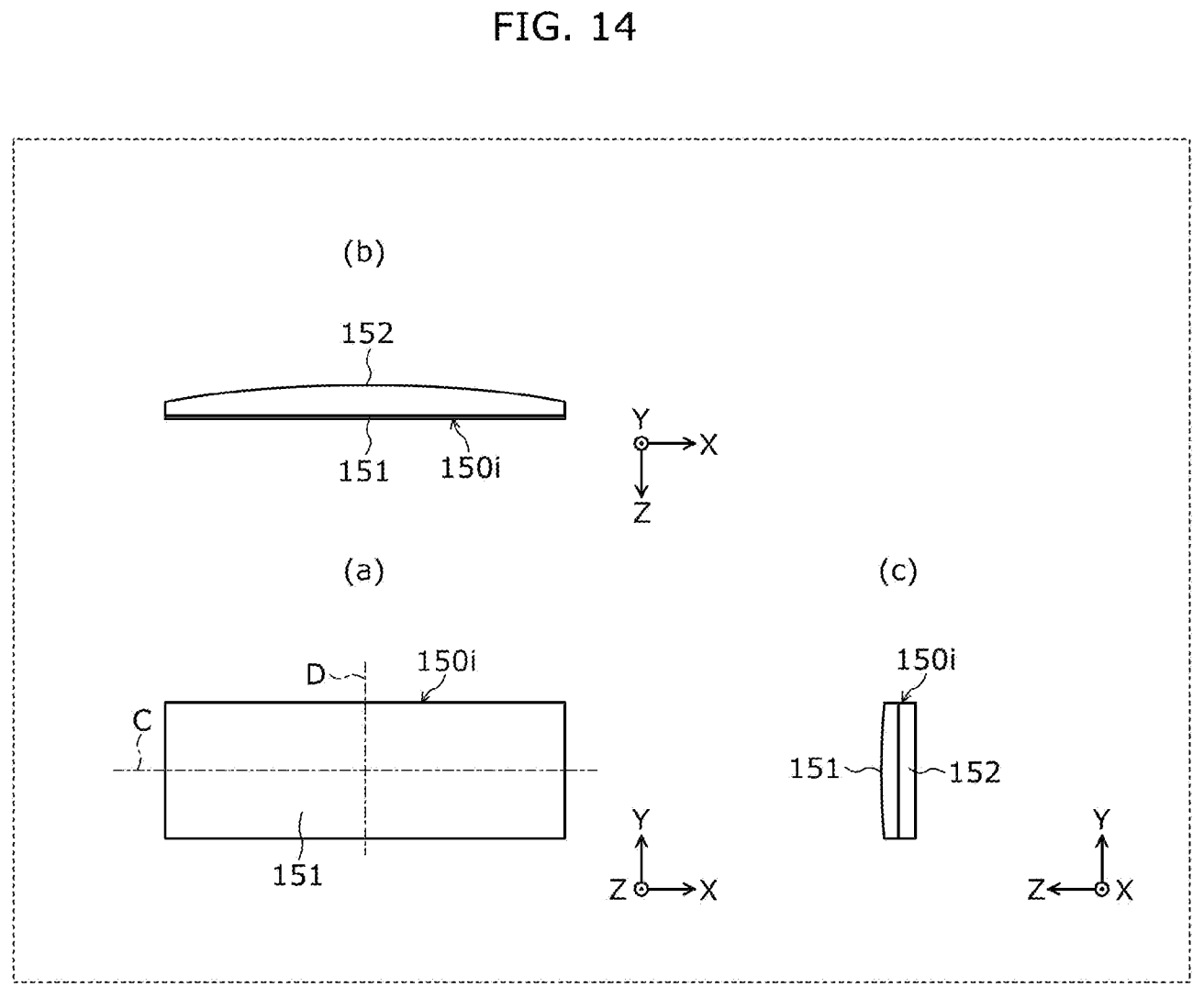

FIG. 14 is a three-view drawing of convex lens 150*i* included in display apparatus 10*i* in FIG. 13. In FIG. 14, (a) is a front view, (b) is a plan view, and (c) is a side view.

As illustrated in FIG. 14, one main surface 151 is a convex cylindrical surface of which the axial direction is parallel to a first direction. That is, one main surface 151 is a surface expanding in a circumferential direction around axis C extending in the first direction (axial direction: see (a) in FIG. 14). The first direction is a direction along X axis in FIG. 14.

Other main surface 152 is a convex cylindrical surface of which the axial direction is parallel to a second direction orthogonal to the first direction. That is, other main surface 152 is a surface expanding in a circumferential direction around axis D extending in the second direction (axial direction: see (a) in FIG. 14). The second direction is a direction along Y axis in FIG. 14.

Other main surface 152 is a surface opposite to one main surface 151 and is aligned with one main surface 151 in a third direction orthogonal to both the first direction and the second direction. That is, other main surface 152 is superposed on one main surface 151 when viewed in the third direction. The third direction is a direction along Z axis in FIG. 14.

Other main surface 152 protrudes in a direction opposite to that in which one main surface 151 protrudes. Specifically, one main surface 151 protrudes in one direction parallel to the third direction (positive Z-axis direction) and other main surface 152 protrudes in an other direction parallel to the third direction (negative Z-axis direction).

Moreover, the curvature of one main surface 151 and the curvature of other main surface 152 differ from each other so as not to cause astigmatism.

Note that, for example, both one main surface 151 and other main surface 152 may be cylindrical surfaces of which the axial directions are parallel to the first direction or to the second direction. Moreover, for example, the curvature of one main surface 151 and the curvature of other main surface 152 may be equal.

Display apparatus 10*i* according to Embodiment 11 has been described above.

In optical device 30*i* according to Embodiment 11, each of one main surface 151 and other main surface 152 of convex lens 150*i* is a cylindrical surface.

This brings the image displayed by display 20 into focus easily while preventing the light transmitted through convex lens 150*i* from converging to one point.

Moreover, in optical device 30*i* according to Embodiment 11, the curvature of one main surface 151 and the curvature of other main surface 152 differ from each other.

This prevents astigmatism from occurring.

Embodiment 12

Figure 15:
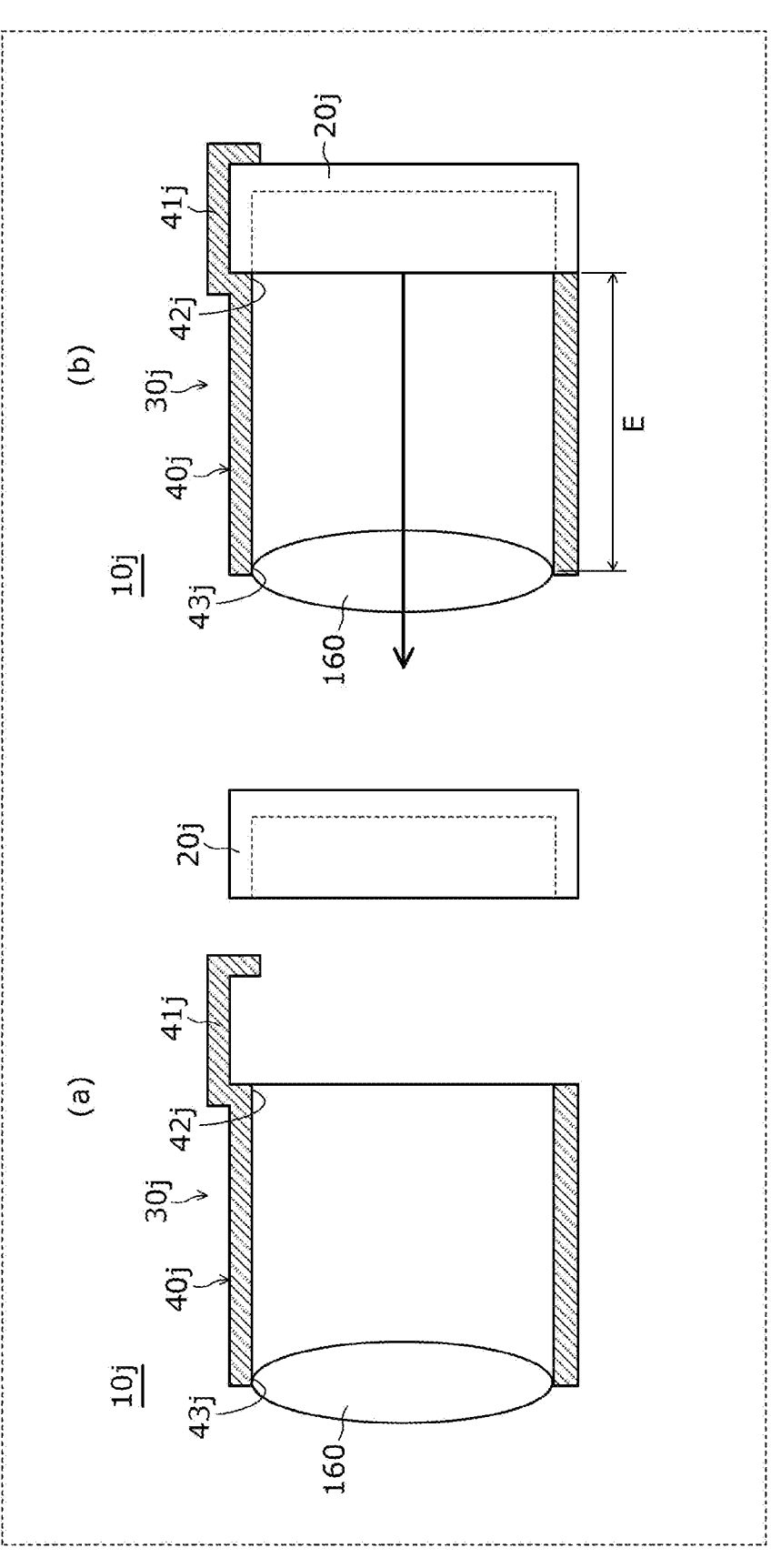
FIG. 15 illustrates a display apparatus according to Embodiment 12.

FIG. 15 illustrates display apparatus 10*j* according to Embodiment 12. In FIG. 15, (a) illustrates a state in which optical device 30*j* in display apparatus 10*j* according to Embodiment 12 is dismounted from display 20*j*, whereas (b) illustrates a state in which optical device 30*j* in display apparatus 10*j* according to Embodiment 12 is mounted on display 20*j*. In FIG. 15, housing 40*j* is illustrated in cross section.

As illustrated in FIG. 15, display apparatus 10*j* includes display 20*j* and optical device 30*j*.

Display device 20*j* mainly differs from display device 20 in having the external appearance different from that of display 20.

Optical device 30*j* includes housing 40*j* and convex lens 160. For example, optical device 30*j* is a device that can be detachably mounted on display 20*j* that is originally installed in vehicle 1.

Housing 40*j* is detachably mounted on display 20*j*. Housing 40*j* includes mounting portion 41*j*, entrance 42*j*, and exit 43*j*.

Mounting portion 41*j* is used for detachably mounting housing 40*j* on display 20*j*. In this embodiment, mounting portion 41*j* has a hook shape to catch display 20*j*. That is, as display 20*j* is caught by mounting portion 41*j*, housing 40*j* is mounted on display 20*j* (see (b) in FIG. 15).

Entrance 42*j* allows light emitted from display 20*j* to enter the interior of housing 40*j* with housing 40*j* mounted on display 20*j*. Entrance 42*j* is a through-hole that connects the spaces inside and outside housing 40*j*. Entrance 42*j* faces display 20*j* with housing 40*j* mounted on display 20*j*.

Exit 43*j* allows the light having entered the interior of housing 40*j* through entrance 42*j* to exit to the exterior of housing 40*j*. Exit 43*j* is a through-hole that connects the spaces inside and outside housing 40*j*. Exit 43*j* faces entrance 42*j*.

Convex lens 160 is disposed on the optical path extending from entrance 42*j* to exit 43*j*. In this embodiment, convex lens 160 is disposed at exit 43*j* and allows the light having entered the interior of housing 40*j* through entrance 42*j* to be transmitted and exit to the exterior of housing 40*j* through exit 43*j*.

With housing 40*j* mounted on display 20*j*, distance E from display 20*j* to convex lens 160 is shorter than the focal length of convex lens 160. For example, distance E is a distance from the front face of display 20_j_ to the center of convex lens 160 in the optical axis direction.

The light having entered the interior of housing 40_j_ through entrance 42_j_ is transmitted through convex lens 160 to exit to the exterior of housing 40_j_ through exit 43_j_ (see a thick line arrow in (b) in FIG. 15).

Note that, for example, convex lens 160 may be a Fresnel lens, such as convex lens 150_h_, or a convex lens with cylindrical surfaces, such as convex lens 150_i_.

Display apparatus 10_j_ according to Embodiment 12 has been described above.

Optical device 30_j_ according to Embodiment 12 includes housing 40_j_ and convex lens 160. Housing 40_j_ can be detachably mounted on display 20_j_ and includes entrance 42_j_ that allows the light emitted from display 20_j_ to enter the interior of housing 40_j_ with housing 40_j_ mounted on display 20_j_ and exit 43_j_ that allows the light having entered the interior of housing 40_j_ through entrance 42_j_ to exit to the exterior of housing 40_j_. Convex lens 160 is disposed on the optical path extending from entrance 42_j_ to exit 43_j_. With housing 40_j_ mounted on display 20_j_, distance E from display 20_j_ to convex lens 160 is shorter than the focal length of convex lens 160.

According to this, when bringing the image displayed by display 20_j_ into focus becomes difficult, mounting housing 40_j_ on display 20_j_ can cause the image displayed by display 20_j_ to be displayed farther compared to before housing 40_j_ is mounted on display 20_j_, and thereby the image displayed by display 20_j_ can be brought into focus easily.

Embodiment 13

Figure 16:
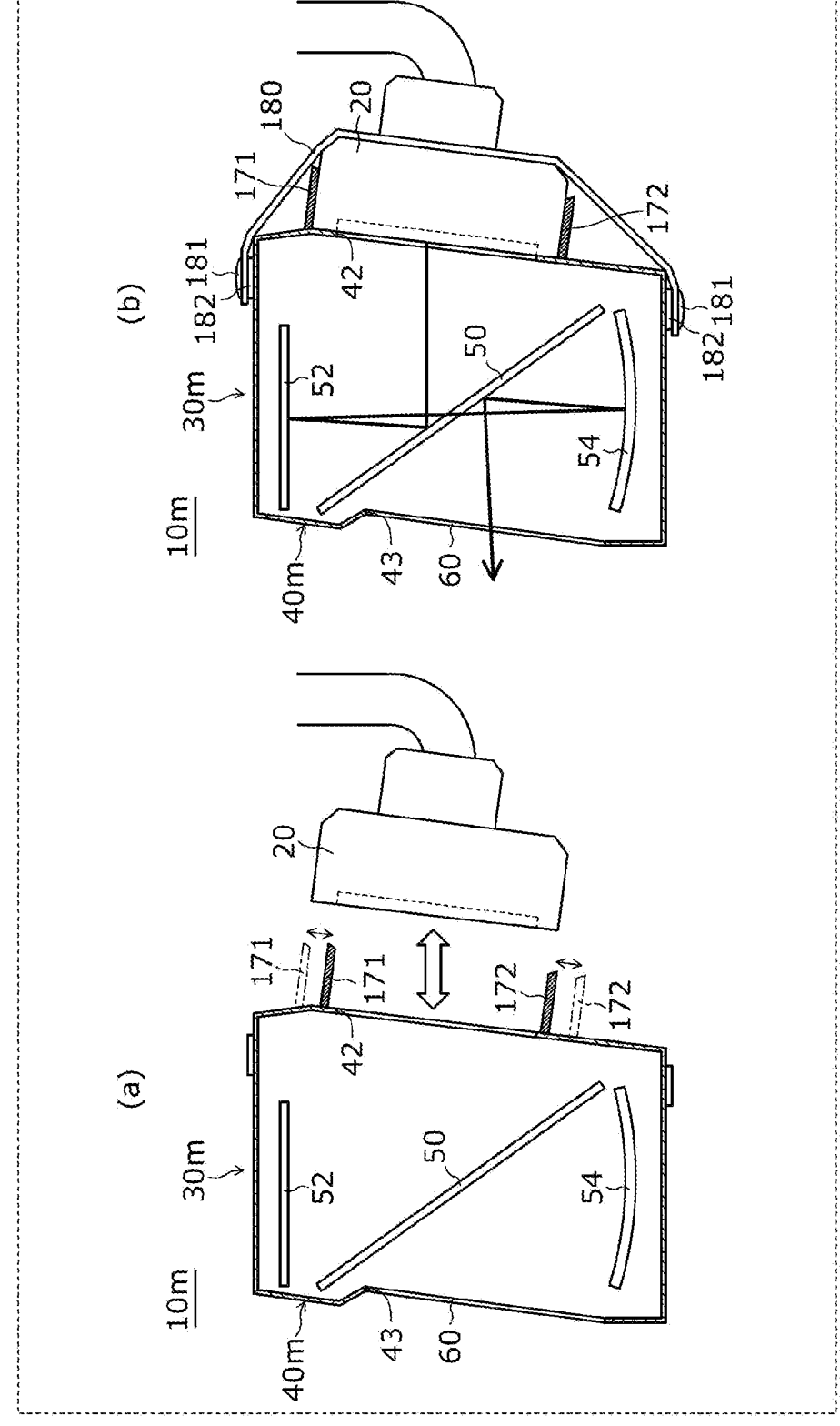
FIG. 16 illustrates a display apparatus according to Embodiment 13.
Figure 17:
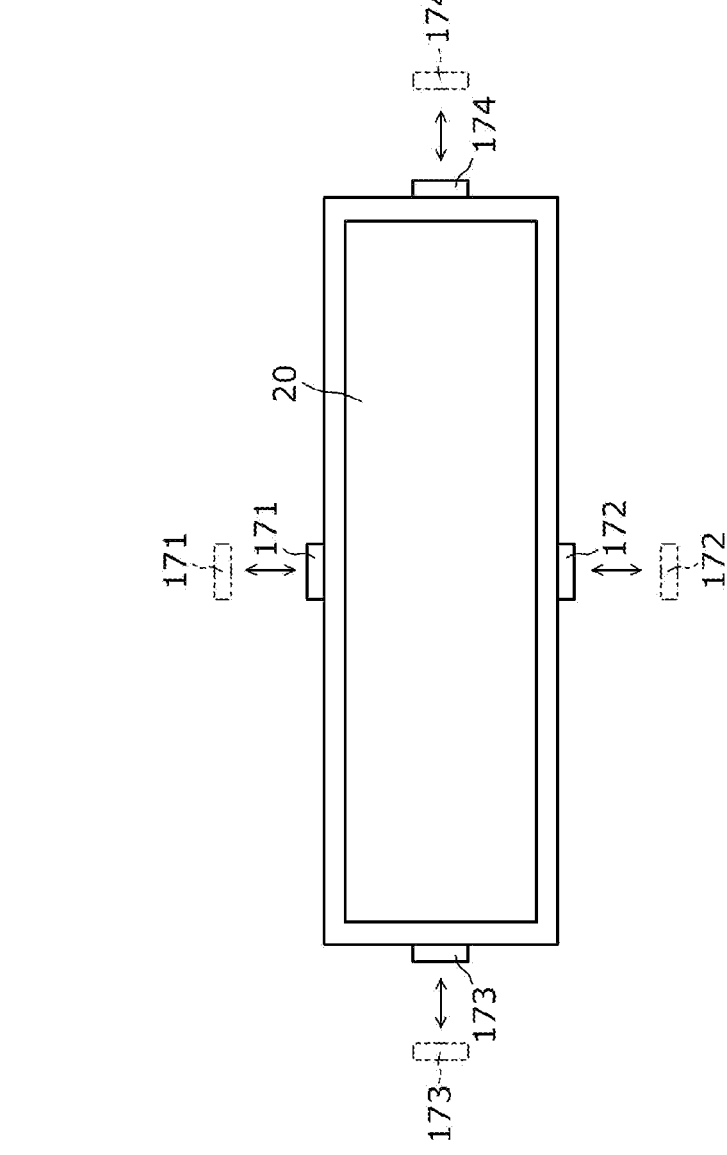
FIG. 17 illustrates an arrangement of guides included in the display apparatus in FIG. 16.

FIG. 16 illustrates display apparatus 10_m_ according to Embodiment 13. In FIG. 16, (a) illustrates a state in which optical device 30_m_ in display apparatus 10_m_ according to Embodiment 13 is dismounted from display 20, whereas (b) illustrates a state in which optical device 30_m_ in display apparatus 10_m_ according to Embodiment 13 is mounted on display 20. In FIG. 16, housing 40_m_ is illustrated in cross section. FIG. 17 illustrates an arrangement of guides included in display apparatus 10_m_ in FIG. 16.

As illustrated in FIG. 16, display apparatus 10_m_ includes display 20 and optical device 30_m_.

Optical device 30_m_ mainly differs from optical device 30 in the shapes of portions for mounting optical device 30_m_ on display 20. Specifically, housing 40_m_ of optical device 30_m_ does not have a recess in which display 20 is fitted, and entrance 42 is flush with housing 40_m_. Moreover, as illustrated in FIG. 17, optical device 30_m_ includes, in the periphery of entrance 42, movable upper guide 171 lower guide 172, left guide 173, and right guide 174 instead of the recess. In the periphery of entrance 42, upper guide 171 is disposed at a position corresponding to an upper part of display 20 when display 20 is viewed from the front, lower guide 172 is disposed at a position corresponding to a lower part of display 20 when display is viewed from the front, left guide 173 is disposed at a position corresponding to a left part of display 20 when display 20 is viewed from the front, and right guide 174 is disposed at a position corresponding to a right part of display 20 when display 20 is viewed from the front. Moreover, at least one of upper guide 171 or lower guide 172 is movable in a direction in which upper guide 171 and lower guide 172 are aligned. In Embodiment 13, at least one of upper guide 171 or lower guide 172 is movable in the vertical direction of housing 40_m_ mounted on display 20. In Embodiment 13, both upper guide 171 and lower guide 172 are movable. Similarly, at least one of left guide 173 or right guide 174 is movable in a direction in which left guide 173 and right guide 174 are aligned. In Embodiment 13, at least one of left guide 173 or right guide 174 is movable in the lateral direction of housing 40_m_ mounted on display 20. In Embodiment 13, both left guide 173 and right guide 174 are movable.

For example, housing 40_m_ has a groove (not illustrated) by which upper guide 171 is supported to be movable in a predetermined range, and includes a spring or the like (not illustrated) that biases upper guide 171 toward lower guide 172. Moreover, for example, housing 40_m_ has a groove (not illustrated) by which lower guide 172 is supported to be movable in a predetermined range, and includes a spring or the like (not illustrated) that biases lower guide 172 toward upper guide 171. Moreover, for example, housing 40_m_ has a groove (not illustrated) by which left guide 173 is supported to be movable in a predetermined range, and includes a spring or the like (not illustrated) that biases left guide 173 toward right guide 174. Moreover, for example, housing 40_m_ has a groove (not illustrated) by which right guide 174 is supported to be movable in a predetermined range, and includes a spring or the like (not illustrated) that biases right guide 174 toward left guide 173. For example, each of upper guide 171, lower guide 172, left guide 173, and right guide 174 is movable in the above-described manner.

When housing 40_m_ is mounted on display 20, upper guide 171, lower guide 172, left guide 173, and right guide 174 are moved while housing 40_m_ is temporally held such that entrance 42 substantially faces display 20. Next, as illustrated in (b) in FIG. 16, housing 40_m_ is secured to display 20 by attaching belt 180 onto the upper and lower ends of housing 40_m_. At this moment, belt 180, which is elastic, is provided with fasteners 181 (for example, studs) at both ends of belt 180, and housing 40_m_ is provided with fasteners 182 (for example, sockets) on the top and bottom surfaces of housing 40_m_. Accordingly, attaching fasteners 181 to fasteners 182 while belt 180 is being pulled easily secures housing 40_m_ to display 20. Note that multiple belts 180 can be used.

Housing 40_m_ is mounted on display 20 as display 20 is fitted between upper guide 171 and lower guide 172 and between left guide 173 and right guide 174 in the above-described manner.

Figure 18:
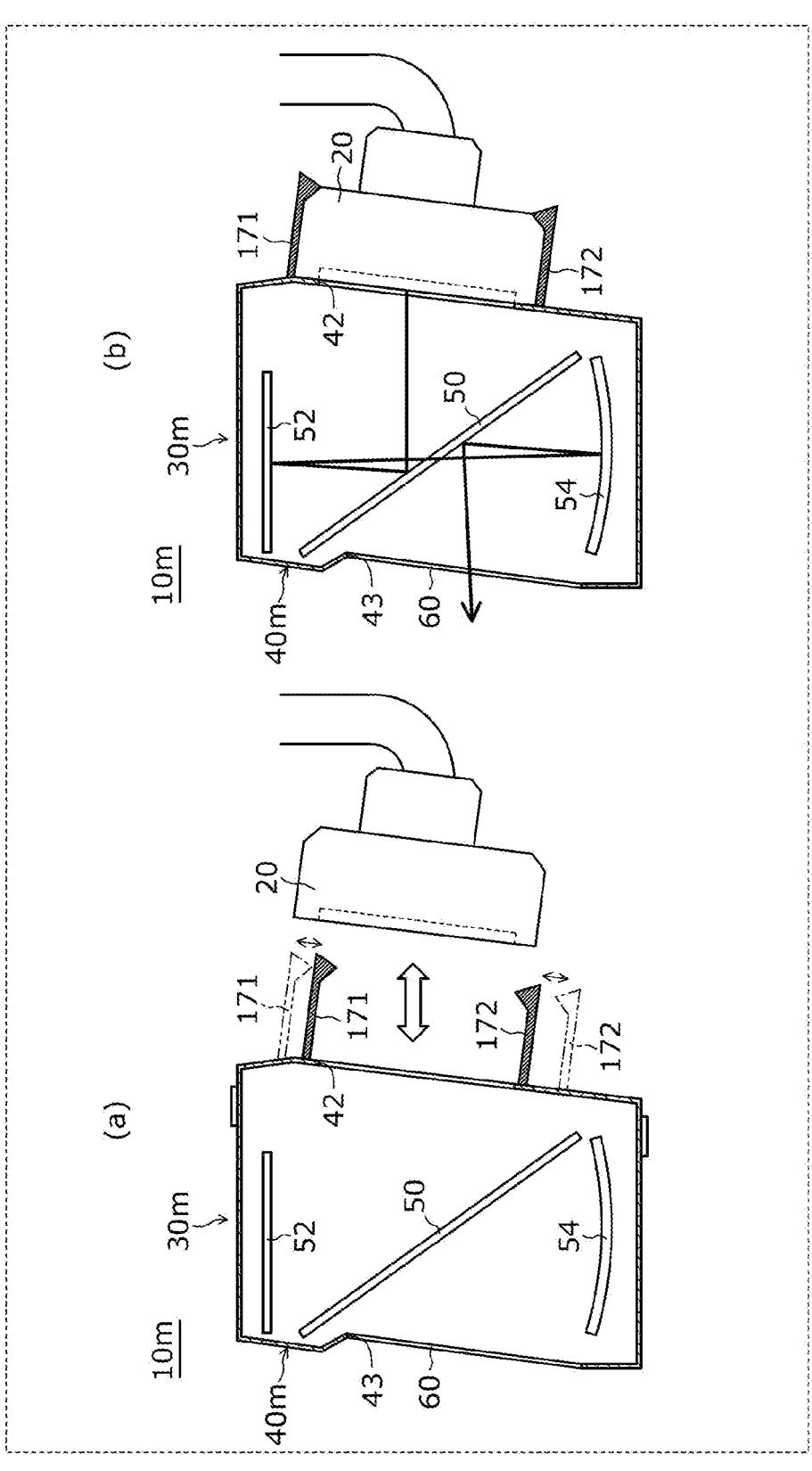
FIG. 18 illustrates a display apparatus according to Embodiment 13.

Note that the guides may have a configuration illustrated in FIG. 18. FIG. 18 illustrates other display apparatus 10_m_ according to Embodiment 13. In FIG. 18, (a) illustrates an other state in which optical device 30_m_ in other display apparatus 10_m_ according to Embodiment 13 is dismounted from display 20, whereas (b) illustrates an other state in which optical device 30_m_ in other display apparatus 10_m_ according to Embodiment 13 is mounted on display 20.

The guides are configured as elastic hooks including expanded ends and elastic portions other than the expanded ends. The elastic hooks have a length that allows the expanded ends to engage with the rear face of display 20. Furthermore, as illustrated in FIG. 17, the elastic hooks that constitute the guides can move individually;

that is, each of upper guide 171 and lower guide 172 can move vertically, whereas each of left guide 173 and right guide 174 can move laterally. At this moment, the guides move with detents for arresting the backward movement. Accordingly, when housing 40_m_ is mounted on display 20, upper guide 171, lower guide 172, left guide 173, and right guide 174 are moved while housing 40_m_ is temporally held such that entrance 42 substantially faces display 20, and thereby the positions of the guides are substantially fixed by the detents. Thus, the configuration in FIG. 18 negates the need for belt 180 and fasteners 181 in the configuration in FIG. 16. Moreover, when housing 40$m$ is dismounted from display 20, the elastic hooks warp to spread out as housing 40$m$ is pulled to the front, allowing housing 40$m$ to be dismounted easily.

Display apparatus 10$m$ according to Embodiment 13 has been described above.

Optical device 30$m$ according to Embodiment 13 further includes, in the periphery of entrance 42, (i) upper guide 171 disposed at the position corresponding to the upper part of display 20 when display 20 is viewed from the front, (ii) lower guide 172 disposed at the position corresponding to the lower part of display 20 when display 20 is viewed from the front, (iii) left guide 173 disposed at the position corresponding to the left part of display 20 when display 20 is viewed from the front, and (iv) right guide 174 disposed at the position corresponding to the right part of display 20 when display 20 is viewed from the front. At least one of upper guide 171 or lower guide 172 is movable in the direction in which upper guide 171 and lower guide 172 are aligned, and at least one of left guide 173 or right guide 174 is movable in the direction in which left guide 173 and right guide 174 are aligned.

According to this, the movable guides enable housing 40$m$ to be mounted on display 20 such that entrance 42 and the screen of display 20 are in alignment even when the size of display 20 varies. This prevents misalignment or rotational shift of the image caused when, for example, the screen of display 20 is out of alignment with entrance 42 and shifted vertically, laterally, or diagonally with respect to entrance 42 during securing.

Embodiment 14

Figure 19:
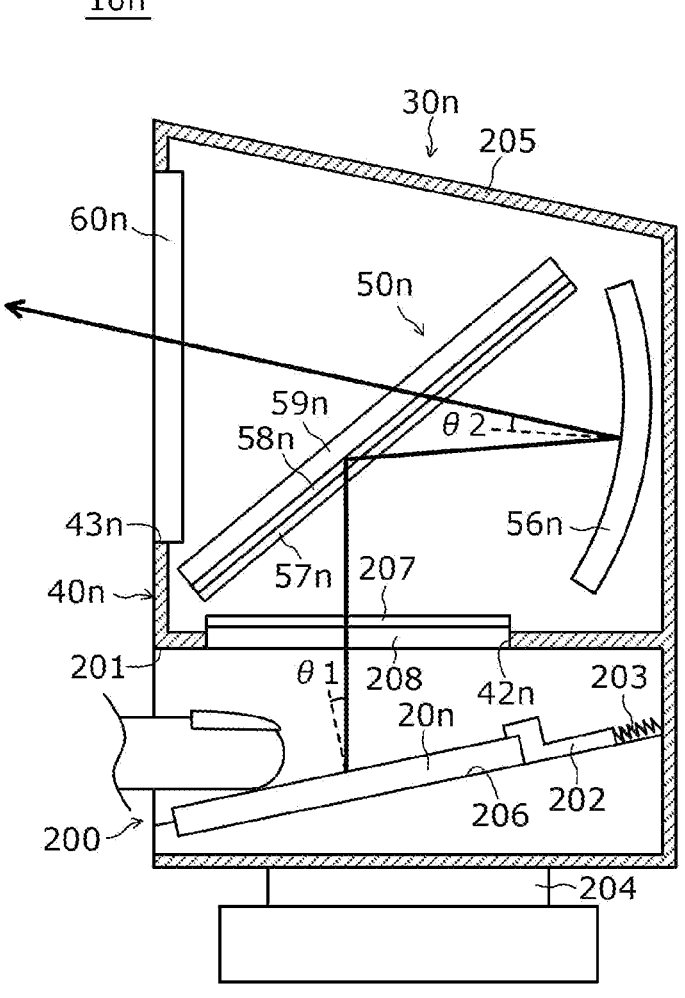
FIG. 19 illustrates a display apparatus according to Embodiment 14.

FIG. 19 illustrates display apparatus 10$n$ according to Embodiment 14.

As illustrated in FIG. 19, display apparatus 10$n$ includes display 20$n$ and optical device 30$n$.

Optical device 30$n$ mainly differs from optical device 30 in the shapes of portions for mounting optical device 30$n$ on display 20$n$. Specifically, housing 40$n$ includes, at a lower part thereof, placement portion 200 in which a smartphone that is display 20$n$, for example, can be placed. This enables driver 2 to view the image on the smartphone as a virtual image through light-transmitting cover 60$n$ instead of the image behind vehicle 1.

Optical device 30$n$ includes housing 40$n$, multiple mirrors, and light-transmitting cover 60$n$. Housing 40$n$ is detachably mounted on display 20$n$. Housing 40$n$ includes entrance 42$n$, exit 43$n$, and placement portion 200.

Entrance 42$n$ allows light emitted from display 20$n$ to enter the interior of housing 40$n$ with housing 40$n$ mounted on display 20$n$. Exit 43$n$ allows the light having entered the interior of housing 40$n$ through entrance 42$n$ to exit to the exterior of housing 40$n$.

Display 20$n$ is removably placed in placement portion 200 such that display 20$n$ faces entrance 42$n$ and that display 20$n$ is located at a predetermined distance from entrance 42$n$. In Embodiment 14, as display 20$n$ is placed in placement portion 200, housing 40$n$ is mounted on display 20$n$. Placement portion 200 has a configuration that causes display 20$n$ to be placed such that the screen of display 20$n$ faces entrance 42$n$. Specifically, placement portion 200 has opening 201 through which display 20$n$ is placed and removed. With this configuration, entrance 42$n$ and light-transmitting cover 60$n$ are substantially perpendicular to each other as illustrated in FIG. 19. Accordingly, to output light traveling upward in FIG. 19 in a direction perpendicular to the direction of travel, optical device 30$n$ may have a configuration in which the light is reflected two times or a configuration in which the light is reflected three times as illustrated in (b) in FIG. 9.

Note that placement portion 200 has opening 201 only at a part, on the left side in FIG. 19, into which a finger is inserted and that portions other than opening 201 are walls of housing 40$n$ surrounding display 20$n$. This configuration prevents external light from reflecting in the screen of display 20$n$.

Opening 201 has a predetermined size that allows the smartphone that is display 20$n$ to be placed and removed and that allows a user to operate the smartphone placed in placement portion 200. Furthermore, placement portion 200 includes inclined surface 206 on which display 20$n$ is to be placed. Inclined surface 206 facilitates the operation of display 20$n$.

Note that the image viewed through light-transmitting cover 60$n$ may be distorted when display 20$n$ is placed on inclined surface 206 without any adjustments. Accordingly, in Embodiment 14, as illustrated in FIG. 19, the angle of concave mirror 56$n$ is set such that emission angle $\theta 1$ from the screen of display 20$n$ placed on inclined surface 206 is substantially equal to reflection angle 82 from concave mirror 56$n$. That is, at least one mirror included in optical device 30$n$ includes concave mirror 56$n$. Display 20$n$ is removably placed in placement portion 200 such that emission angle $\theta 1$ of light emitted from display 20$n$ is equal to reflection angle 82 of the light from concave mirror 56$n$. For example, emission angle $\theta 1$ is an angle with respect to the direction normal to the screen of display 20$n$. This configuration prevents the image viewed through light-transmitting cover 60$n$ from being distorted even when placement portion 200 is inclined.

Moreover, placement portion 200 includes first movable stopper 202 that abuts on one of the upper and lower sides of display 20$n$ when display 20$n$ is viewed from the front and a second movable stopper (not illustrated) that abuts on one of the left and right sides of display 20$n$ when display 20$n$ is viewed from the front. That is, placement portion 200 includes first movable stopper 202 that abuts on either the upper side or the lower side of display 20$n$ when display 20$n$ is viewed from the front and the second movable stopper (not illustrated) that abuts on either the left side or the right side of display 20$n$ when display 20$n$ is viewed from the front. In the configuration in FIG. 19, first movable stopper 202 abuts on the upper edge of display 20$n$. Note that no first movable stopper is disposed on the lower side of display 20$n$ here.

First movable stopper 202 is connected to spring 203. This allows first movable stopper 202 to secure display 20$n$ using the reaction force of spring 203. Moreover, although not illustrated in FIG. 19, the second movable stopper having a configuration similar to that of first movable stopper 202 is also disposed on, for example, the left side of display 20$n$. In this case, no second movable stopper is disposed on the right side. Accordingly, display 20$n$ is inserted to be placed in placement portion 200 as spring 203 and the like are pushed such that the upper side and the left side of display 20$n$ respectively abut on first movable stopper 202 and the second movable stopper. This allows display 20$n$ to be easily secured in placement portion 200.

Note that a part of first movable stopper 202 on the upper side covers a part of the screen of display 20$n$ on the upper side as illustrated in FIG. 19. The similar configuration is applied to the second movable stopper disposed on the left side. This prevents display 20n from moving even when vehicle 1 vibrates.

Moreover, in placement portion 200, first movable stopper 202 is not necessarily disposed on the upper side of display 20n and may be disposed on the lower side. Moreover, in placement portion 200, the second movable stopper is not necessarily disposed on the left side of display 20n and may be disposed on the right side.

The multiple mirrors include half mirror 50n and concave mirror 56n. Half mirror 50n reflects the light emitted from display 20n to concave mirror 56n and transmits the light reflected by concave mirror 56n. Half mirror 50n includes quarter-wave retarder 57n, reflective polarizer 58n, and glass base 59n. Quarter-wave retarder 57n, reflective polarizer 58n, and glass base 59n are laminated in stated order. Note that optical device 30n may include only one mirror, not multiple mirrors.

Optical device 30n includes quarter-wave retarder 207 and glass base 208. Quarter-wave retarder 207 and glass base 208 are laminated together and disposed at entrance 42n. Quarter-wave retarder 207 and glass base 208 transmit the light emitted from display 20n.

In this optical system, in a case where display 20n emits P-polarized light, the P-polarized light is converted into circularly polarized light when being transmitted through quarter-wave retarder 207. The circularly polarized light is converted into S-polarized light by quarter-wave retarder 57n and reaches reflective polarizer 58n. Because reflective polarizer 58n reflects S-polarized light and transmits P-polarized light, the S-polarized light having reached reflective polarizer 58n is reflected by reflective polarizer 58n and reaches quarter-wave retarder 57n again. As a result, the S-polarized light is converted into circularly polarized light and is reflected by concave mirror 56n. The circularly polarized light reflected by concave mirror 56n is converted into P-polarized light by quarter-wave retarder 57n. The P-polarized light is transmitted through reflective polarizer 58n and exits through light-transmitting cover 60n toward a viewer. The light emitted from display 20n is reflected two times in housing 40n before exiting by following the optical path above.

Note that stand 204 is disposed on the bottom surface of placement portion 200 in housing 40n. Stand 204 is used for securing housing 40n to, for example, the dashboard and includes a suction cup or a double-sided tape at a part secured to the dashboard. Stand 204 may include a pan and tilt mechanism that allows entire housing 40n to move vertically and laterally so that the orientation of light-transmitting cover 60n can be adjusted for better view. Moreover, hood 205 that supports light-transmitting cover 60n is disposed in an upper part of housing 40n. This reduces reflection of external light in light-transmitting cover 60n.

Display apparatus 10n according to Embodiment 14 has been described above.

In optical device 30n according to Embodiment 14, housing 40n further includes placement portion 200 in which display 20n is removably placed such that display 20n faces entrance 42n and that display 20n is located at the predetermined distance from entrance 42n.

This allows the image displayed by, for example, mobile display 20n placed in placement portion 200 to be displayed farther as a virtual image, and thereby the image displayed by display 20n can be brought into focus easily.

Moreover, at least one mirror includes concave mirror 56n. Display 20n is removably placed in placement portion 200 such that emission angle θ1 of light emitted from display 20n is equal to reflection angle 82 of the light from concave mirror 56n.

This prevents the image formed by the light emitted from display 20n from being distorted.

Moreover, placement portion 200 includes first movable stopper 202 that abuts on either the upper side or the lower side of display 20n when display 20n is viewed from the front and the second movable stopper that abuts on either the left side or the right side of display 20n when display 20n is viewed from the front.

This allows display 20n to be easily secured in placement portion 200.

Note that placement portion 200 may include a contactless power feed mechanism that supplies power to display 20n. In this case, display 20n continues to receive power, and the battery of display 20n will not run out of power. Thus, display 20n is prevented from being turned off.

Embodiment 15

Figure 20:
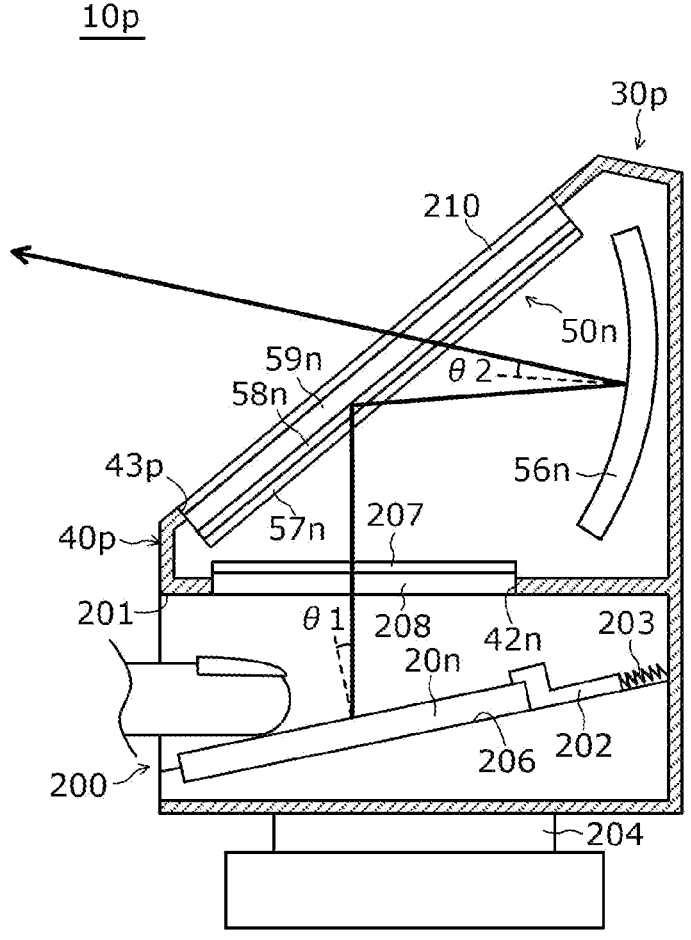
FIG. 20 illustrates a display apparatus according to Embodiment 15.

FIG. 20 illustrates display apparatus 10p according to Embodiment 15.

In display apparatus 10p in Embodiment 15, elements identical to those of display apparatus 10n in Embodiment 14 will be referenced by the same designators, and the detailed explanations will be omitted. That is, in FIG. 20, the distinctive configuration of display apparatus 10p is that, in optical device 30p, housing 40p does not include hood 205 in housing 40n of optical device 30n and that transmissive polarizer 210 is provided for a light-transmitting cover disposed at exit 43p. Note that half mirror 50n in the configuration of display apparatus 10p in FIG. 20 also has the function of a light-transmitting cover.

Transmissive polarizer 210 is disposed at exit 43p of housing 40p. Here, transmissive polarizer 210 is affixed to half mirror 50n and disposed at exit 43p together with half mirror 50n. Transmissive polarizer 210 transmits external light reaching exit 43p from outside housing 40p to introduce into housing 40p. This can reduce the possibility that external light is reflected in half mirror 50n. The configuration other than the above is identical to that of display apparatus 10n. Accordingly, housing 40p can be reduced in size compared with display apparatus 10n in FIG. 19 due to the absence of hood 205.

Display apparatus 10p according to Embodiment 15 has been described above.

Optical device 30p according to Embodiment 15 further includes transmissive polarizer 210 disposed at exit 43p.

This reduces reflection of external light in exit 43p.

Other Embodiments and the Like

Although optical devices according to one or more aspects of the present disclosure have been described above on the basis of the foregoing embodiments, these embodiments are not intended to limit the present disclosure. The scope of the one or more aspects of the present disclosure may encompass forms obtained by various modifications, to the embodiments, that can be conceived by those skilled in the art and forms obtained by combining elements in different embodiments without departing from the spirit of the present disclosure.

In the above-described embodiments, mounting portion 41 is recessed such that display 20 is removably fitted in mounting portion 41, and mounting portion 41j has a hook shape to catch display 20j, although not limited thereto. For example, an optical device may include a magnet attracted to a magnet disposed on a display, and a housing may be detachably mounted on the display using the magnets. Moreover, for example, an optical device may include a belt, and a housing may be detachably mounted on a display using the belt.

Moreover, in the above-described embodiments, the optical devices 30 to 30*i* and optical device 30*k* each include multiple mirrors, although not limited thereto. For example, an optical device need only include at least one mirror. For example, in a case where an optical device includes one mirror, light having entered the interior of a housing through an entrance is reflected by the one mirror and exits to the exterior of the housing through an exit.

While various embodiments have been described herein above, it is to be appreciated that various changes in form and detail may be made without departing from the spirit and scope of the present disclosure as presently or hereafter claimed.

Further Information about Technical Background to this Application

The disclosures of the following patent applications including specification, drawings, and claims are incorporated herein by reference in their entirety: Japanese Patent Application No. 2021-109063 filed on Jun. 30, 2021, and Japanese Patent Application No. 2021-196548 filed on Dec. 2, 2021, and PCT International Application No. PCT/JP2022/000943 filed on Jan. 13, 2022.

INDUSTRIAL APPLICABILITY

The present disclosure can be used for, for example, display apparatuses for displaying images.

The invention claimed is:

1. An optical device comprising:
a housing detachably mountable on a display and including an entrance that allows light emitted from the display to enter an interior of the housing with the housing mounted on the display and an exit that allows the light having entered the interior of the housing through the entrance to exit to an exterior of the housing; and
at least one mirror that reflects the light having entered the interior of the housing through the entrance to the exit, wherein
the at least one mirror includes a half mirror, a first mirror, and a second mirror, and
the light having entered the interior of the housing through the entrance is reflected by the half mirror, reflected by the first mirror after being reflected by the half mirror, reflected by the second mirror after being reflected by the first mirror and transmitted through the half mirror, and reflected by the half mirror after being reflected by the second mirror to exit to the exterior of the housing through the exit.

2. The optical device according to claim 1, further comprising:
a convex lens disposed on an optical path extending from the entrance to the at least one mirror, wherein
the convex lens shrinks an image having entered the interior of the housing through the entrance, and the at least one mirror enlarges an image shrunk by the convex lens.

3. The optical device according to claim 1, further comprising:
a rearview mirror removably attached to the exit or a liquid crystal mirror attached to the exit.

4. The optical device according to claim 1, further comprising:
a light-transmitting cover disposed at the entrance to face the display with the housing mounted on the display.

5. The optical device according to claim 4, further comprising:
an optical film affixed to the light-transmitting cover.

6. The optical device according to claim 1, further comprising:
a position adjuster for adjusting a position of the housing relative to the display with the housing mounted on the display.

7. The optical device according to claim 1, wherein
the display includes a switch for operating the display, and
the optical device further comprises:
an operation portion for operating the switch with the housing mounted on the display.

8. The optical device according to claim 7, wherein
the operation portion includes a first member that can be pushed in a depth direction of the housing and a second member that moves in an intersecting direction intersecting the depth direction to push the switch when the first member is pushed in the depth direction with the housing mounted on the display, and
the second member can move in the intersecting direction with the housing dismounted from the display.

9. The optical device according to claim 1, wherein
the display includes an optical sensor that detects light outside the display, and
the optical device further comprises:
a light guide that guides light to the optical sensor with the housing mounted on the display.

10. The optical device according to claim 1, further comprising:
a rubber component having a ring shape and disposed around a perimeter of the entrance to abut on the display with the housing mounted on the display.

11. The optical device according to claim 1, further comprising:
in a periphery of the entrance, (i) an upper guide disposed at a position corresponding to an upper part of the display when the display is viewed from a front, (ii) a lower guide disposed at a position corresponding to a lower part of the display when the display is viewed from the front, (iii) a left guide disposed at a position corresponding to a left part of the display when the display is viewed from the front, and (iv) a right guide disposed at a position corresponding to a right part of the display when the display is viewed from the front, wherein
at least one of the upper guide or the lower guide is movable in a direction in which the upper guide and the lower guide are aligned, and
at least one of the left guide or the right guide is movable in a direction in which the left guide and the right guide are aligned.

* * * * *